US008213521B2

(12) United States Patent
Deng

(10) Patent No.: US 8,213,521 B2
(45) Date of Patent: Jul. 3, 2012

(54) METHODS AND APPARATUS FOR AUDIENCE MEASUREMENT USING GLOBAL SIGNATURE REPRESENTATION AND MATCHING

(75) Inventor: Kevin Keqiang Deng, Safety Harbor, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 1008 days.

(21) Appl. No.: 12/181,911

(22) Filed: Jul. 29, 2008

(65) Prior Publication Data
US 2009/0049465 A1 Feb. 19, 2009

Related U.S. Application Data

(60) Provisional application No. 60/956,023, filed on Aug. 15, 2007.

(51) Int. Cl.
*H04N 11/02* (2006.01)
(52) U.S. Cl. .................................. 375/240.26
(58) Field of Classification Search ............ 375/240.01, 375/240.26; 382/1, 45, 46, 125, 126; 725/9, 725/14, 16, 19–21, 80, 85, 87, 133, 141, 725/153
See application file for complete search history.

(56) References Cited

U.S. PATENT DOCUMENTS

| 5,481,294 | A | * | 1/1996 | Thomas et al. ............. 725/20 |
| 6,161,137 | A | | 12/2000 | Ogdon et al. |
| 6,421,445 | B1 | | 7/2002 | Jensen et al. |
| 6,484,316 | B1 | | 11/2002 | Lindberg |
| 6,813,475 | B1 | | 11/2004 | Worthy |
| 7,100,181 | B2 | | 8/2006 | Srinivasan et al. |
| 7,672,843 | B2 | * | 3/2010 | Srinivasan et al. ............ 704/231 |
| 2003/0131350 | A1 | | 7/2003 | Peiffer et al. |
| 2005/0177372 | A1 | | 8/2005 | Wang et al. |
| 2006/0195861 | A1 | | 8/2006 | Lee |
| 2006/0277047 | A1 | * | 12/2006 | DeBusk et al. ............... 704/273 |
| 2007/0050832 | A1 | * | 3/2007 | Wright et al. ................. 725/115 |

(Continued)

FOREIGN PATENT DOCUMENTS

WO 2005006768 1/2005

(Continued)

OTHER PUBLICATIONS

Arun Ramaswamy, U.S. Appl. No. 11/957,082, entitled "Methods, Systems, and Apparatus for Multi-Purpose Metering", filed Apr. 2, 2007, 111 pages.

(Continued)

*Primary Examiner* — Frank Duong
(74) *Attorney, Agent, or Firm* — Hanley, Flight & Zimmerman, LLC

(57) ABSTRACT

Methods and apparatus for audience measurement using global signature representation and matching are disclosed. An example method to determine whether a monitored media content presentation corresponds to a reference content source disclosed herein comprises creating a track corresponding to the reference content source and representative of a history of signature matching results when a first site signature in a plurality of site signatures corresponding to the monitored media content presentation and a first reference signature in a plurality of reference signatures corresponding to the reference content source are determined to match at a particular time offset between the first site signature and the first reference signature according to a histogram representing a plurality of distances between the first site signature and the first reference signature corresponding to a respective plurality of time offsets between the first site signature and the first reference signature.

21 Claims, 13 Drawing Sheets

U.S. PATENT DOCUMENTS

2007/0199013 A1  8/2007  Samari et al.

FOREIGN PATENT DOCUMENTS

WO  2006086556  8/2006

OTHER PUBLICATIONS

International Bureau, "International Preliminary Report on Patentability," issued in connection with PCT application No. PCT/US2008/073343, mailed Feb. 25, 2010, 8 pages.

Patent Cooperation Treaty, "International Search Report," issued by the International Searching Authority in connection with PCT application No. PCT/US2008/073343, mailed May 6, 2009 (3 pages).

Patent Cooperation Treaty, "Written Opinion," issued by the International Searching Authority in connection with PCT application No. PCT/US2008/073343, mailed May 6, 2009 (6 pages).

European Patent Office, "First Examination Report," issued in connection with EP Application No. 08797995.1, dated Dec. 7, 2010 (5 pages).

* cited by examiner

FIG. 1
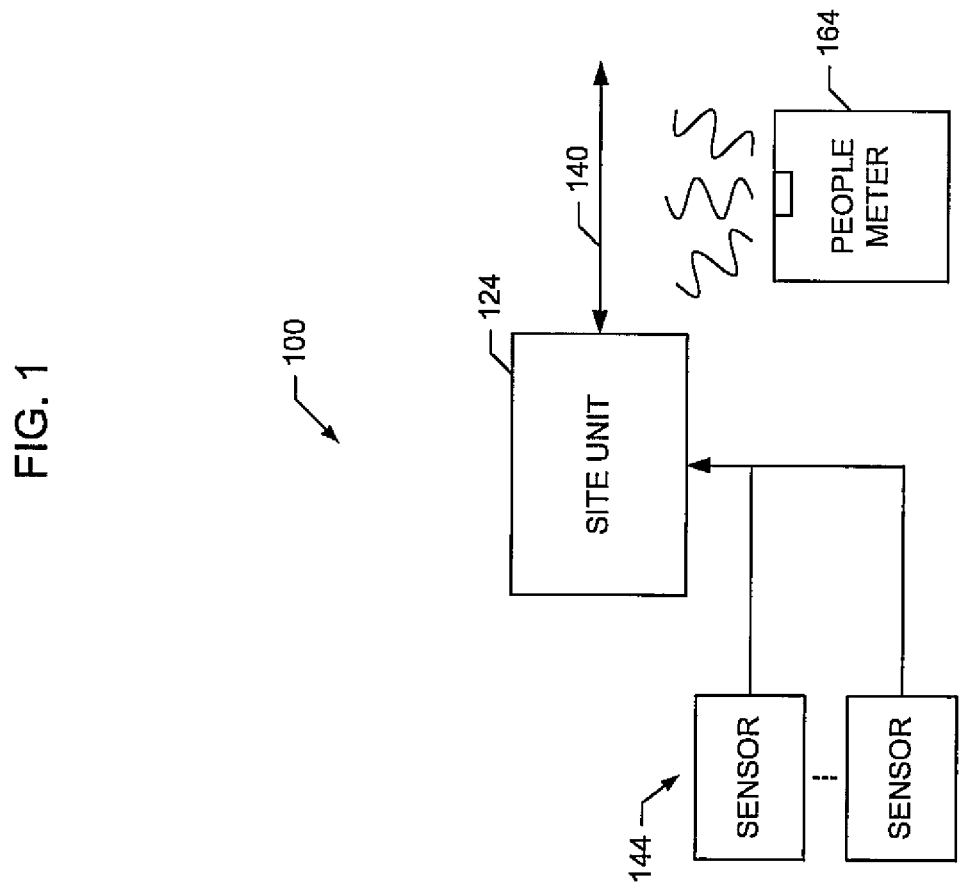
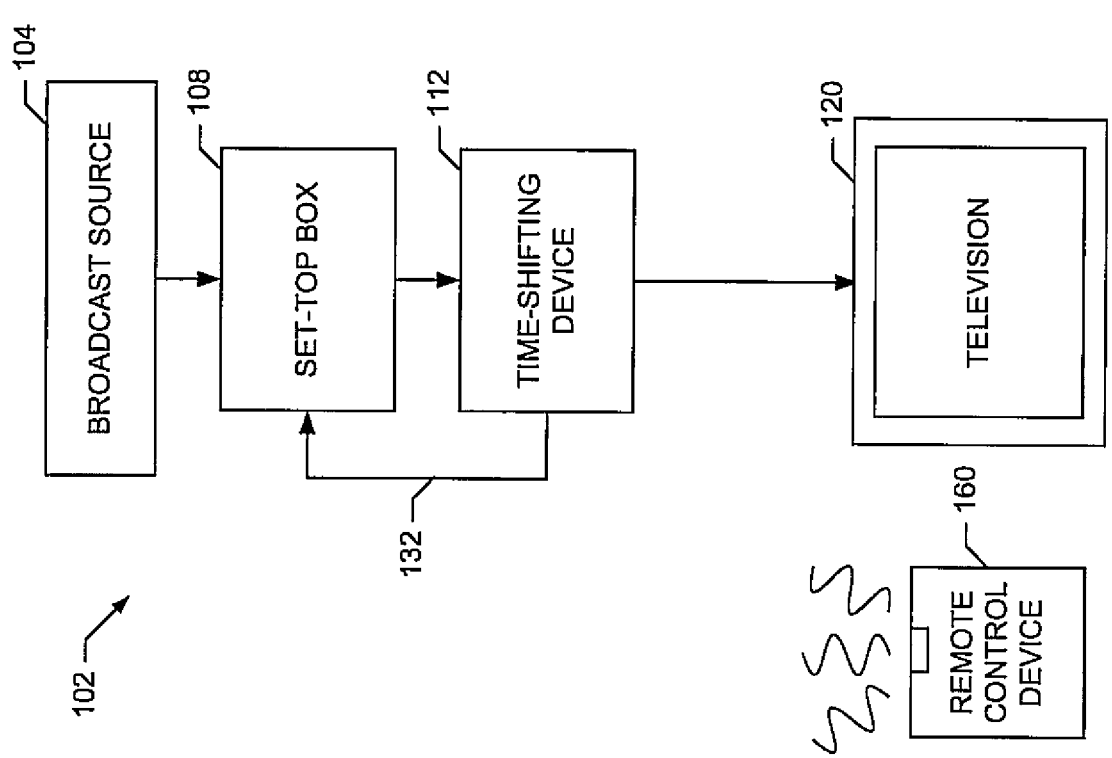

_METHODS AND APPARATUS FOR AUDIENCE MEASUREMENT USING GLOBAL SIGNATURE REPRESENTATION AND MATCHING_

RELATED APPLICATION

This patent claims priority from U.S. Provisional Application Ser. No. 60/956,023, entitled "Methods and Apparatus for Audience Measurement using Global Signature Representation and Matching" and filed on Aug. 15, 2007. U.S. Provisional Application Ser. No. 60/956,023 is hereby incorporated by reference in its entirety.

FIELD OF THE DISCLOSURE

This disclosure relates generally to audience measurement and, more particularly, to methods and apparatus for audience measurement using global signature representation and matching.

BACKGROUND

Audience measurement of exposure to media content, such as television programming, is typically performed by generating and collecting viewing records and/or other exposure information from an audience made up of a group of statistically selected households. Some example audience measurement systems determine signatures representative of the media content presented (e.g., displayed) for consumption (e.g., viewing) by the audience member(s) in each of the statistically selected households. In such an example system, the determined signatures are included in the viewing (or, more generally, exposure) records collected for the group of statistically selected households In general, signature-based media content identification techniques use one or more characteristics of the media (e.g., audio/video) content being presented to an audience member/household to generate a substantially unique proxy or signature (e.g., a series of digital values, a waveform, etc.) for that content. The signature information for the content being presented to the audience member/household may be compared to a set of reference signatures corresponding to a known set of reference media content sources. When a substantial match is found, the media content being presented to the audience member/household can be identified as corresponding to a known reference content source associated with a matching reference signature with a relatively high probability. Accordingly, the ability of a particular signature-based identification technique to measure audience exposure to media content depends, at least in part, on the ability to match reference signatures corresponding to as many different potential reference content sources as possible.

BRIEF DESCRIPTION OF THE DRAWINGS

FIG. 1 is a block diagram of an example local metering system coupled to an example home entertainment system.

DETAILED DESCRIPTION

Figure 2:
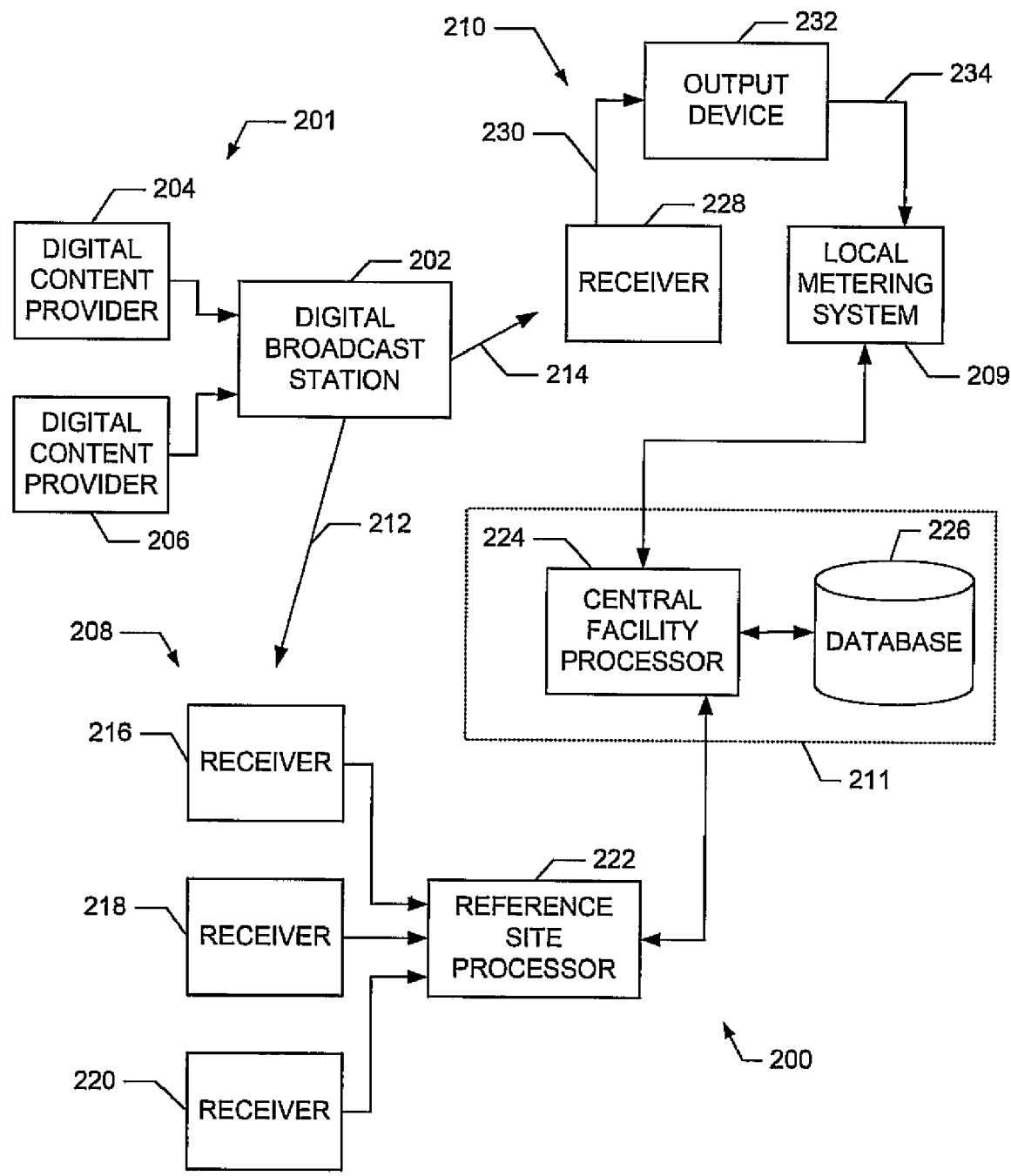
FIG. 2 is a block diagram of an example broadcast system and an example monitoring system, which includes an example local metering system and an example central facility.

A block diagram of an example local metering system 100 for providing viewing and/or other metering information related to the viewing, or more generally, observation of media content via an example home entertainment system 102 is illustrated in FIG. 1. The example home entertainment system 102 includes a media source 104, a set-top box 108, a time-shifting device 112 and a presentation device 120 (e.g., such as a television, stereo, computer, etc.). The example local metering system 100 includes a site unit 124. The components of the home entertainment system 102 and the local metering system 100 may be connected in any manner including that shown in FIG. 1. For example, in a statistically selected household having one or more home entertainment systems 102, each home entertainment system may be associated with a single site unit 124. Additionally, one of the site units 124 may be configured to implement a home unit for the statistically selected household. In such a configuration, the single home unit performs the functions of storing data and forwarding the stored data to a central facility (such as the central facility 211 of FIG. 2 discussed below) via a connection 140 for subsequent processing. Each site unit 124 is coupled to a corresponding home entertainment system 102 and performs the functions of providing one or more interfaces to facilitate the collection of viewing/metering data, processing such data (possibly in real-time) and sending the processed data to the single home unit for storing and reporting to the central facility.

The media source 104 may be any media source, such as a cable television service provider, a satellite television service provider, a radio frequency (RF) television service provider, a multicast source, a unicast source, an Internet streaming video/audio provider, etc. The media source 104 may provide analog and/or digital television signals to the home entertainment system 102, for example, over a coaxial cable or via a wireless connection.

The set-top box 108 may be any set-top box, such as a cable television converter, a direct broadcast satellite (DBS) decoder, a video cassette recorder (VCR), etc. The set-top box 108 receives a plurality of broadcast channels and/or media content selections from the media source 104. In an example implementation, the set-top box 108 selects one of the plurality of broadcast channels based on a user input, and outputs one or more signals received via the selected broadcast channel. In the case of an analog signal, the set-top box 108 tunes to a particular channel to obtain media content delivered on that channel. For a digital signal, the set-top box 108 decodes certain packets of data to obtain the media content delivered on a selected channel. For some home entertainment systems 102, for example, those in which the media source 104 is a standard RF analog television service provider or a basic analog cable television service provider, the set-top box 108 may not be present as its function is performed by a tuner in the presentation device 120 and/or the time-shifting device 112.

The output of the set-top box 108 is coupled to the input of a time-shifting device 112. Alternatively, the set-top box 108 and the time-shifting device 112 may be integrated into a single unit. (For configurations in which the set-top box 108 is not present, the media source 104 and/or an audio/video signal output of the presentation device 120 may be coupled to the input of the time-shifting device 112). In general, the time-shifting device 112 allows for the recording and/or capture of media for subsequent playback at a later point in time, thereby time-shifting the exposure to the media presentation. The time-shifting device 112 may be, for example, a digital video recorder (DVR) or a personal video recorder (PVR), both of which are well-known devices. A PVR is a DVR that has been configured to be automatically adaptive to or otherwise automatically responsive to the viewing preferences of a particular user or group of users within a particular household. For example, many DVRs provide a phone line or other network connection that enables the DVR to communicate with a central service facility that receives viewer preference information from the DVR and that sends configuration information to the DVR based on those viewer preferences. The configuration information is used by the DVR to automatically configure the DVR to record media content consistent with the preferences of the viewer or viewers associated with that DVR. TiVo® is one well-known service that provides PVR functionality to an otherwise standard or conventional DVR. Although the examples described herein correspond to the time-shifting device 112 being a DVR or PVR that records audio/video media content, the time-shifting device 112 could be any other type of recording device that records any desired type of audio information, video information and/or image information. For example, the time-shifting device 112 could be a VCR, a personal computer, an iPod® or other personal media device capable of recording and/or capturing any type of information including, for example, web pages, broadcast audio data and/or broadcast video data.

In the illustrated example, the time-shifting device 112 is also coupled to the set-top box 108 via a return connection 132. (In an alternative implementation, the connection 132 could be configured to provide a control interface between the time-shifting device 112 and the presentation device 120 if, for example, the set-top box 108 is not present). The return connection 132 allows the time-shifting device 112 to direct the set-top box 108 (or presentation device 120), for example, to select a desired broadcast channel for viewing and/or recording. The time-shifting device 112 may also use the return connection 132 to control other features of the set-top box 108 (or presentation device 120), such as volume control, programming guide display, etc.

The example time-shifting device 112 may be configured to record media content being broadcast on a channel selected by the set-top box 108 (or presentation device 120). Alternatively or additionally, the time-shifting device 112 may be configured to cause the presentation device 120 to present currently broadcast media content or previously recorded media content. Many time-shifting devices 112 are able to cause the presentation device 120 to simultaneously present currently broadcast media content and previously recorded media content. Thus, the time-shifting device 112 may provide a viewer with the ability, for example, to pause, rewind and even fast-forward "live" broadcast media content (although in actuality the live broadcast media content is delayed within the time-shifting device 112 to the extent with which the media content is paused or rewound) and/or present two broadcast media content selections simultaneously (e.g., using a picture-in-picture or split-screen format). The time-shifting device 112 may also be used to record broadcast media content for viewing at a later time.

The output from the time-shifting device 112 is fed to the presentation device 120. The presentation device 120 may be any type of television or television display device. For example, the presentation device 120 may be a television and/or display device that supports the National Television Standards Committee (NTSC) standard, the Phase Alternating Line (PAL) standard, the Système Électronique pour Couleur avec Mémoire (SECAM) standard, a standard developed by the Advanced Television Systems Committee (ATSC), such as high definition television (HDTV), a standard developed by the Digital Video Broadcasting (DVB) Project, or may be a multimedia computer system, etc.

The site unit 124 is a data logging and processing unit that may be used to generate viewing records and other viewing information useful for determining ratings and other metering information based on a group of statistically selected households. An example viewing record includes, for example, an identifier for the site unit 124, time-stamped channel selection data indicating the channel selected by the set-top box 108 at any given time, time-stamped code and/or signature data (discussed in greater detail below) indicating the media content being presented at any given time, etc. The site unit 124 typically collects a set of viewing records and transmits the collected viewing records over the connection 140 to a central office or data processing facility (not shown) for further processing or analysis. The connection 140 may be a telephone line, a return cable television connection, an RF or satellite connection, an Internet connection or the like.

The site unit 124 may be configured to determine identifying information based on the signal corresponding to the media content being output by the time-shifting device 112. For example, the site unit 124 may be configured to decode an embedded ancillary code in a signal received via one or more sensors 144 (discussed in greater detail below) that corresponds to the media content currently being output by the time-shifting device 112 for presentation by the presentation device 120. The ancillary code may have been embedded by the media source 104 from which the media content was broadcast or may have been embedded by the time-shifting device 112 or may have been embedded at any other point in the distribution chain.

Alternatively or additionally, the site unit 124 may be configured to generate a media content signature based on the signal received via one or more sensors 144 (discussed in greater detail below) that corresponds to the media content currently being output by the time-shifting device 112 for presentation by the presentation device 120. For example, the media content signatures may include audio and/or video signatures based on frequency and/or amplitude characteristics of the presented media content. The site unit may then add this media content identifying information to the viewing records corresponding to the currently presented media content.

To facilitate the determination of media content identifying information and the generation of viewing records for the currently presented media content, the site unit 124 is provided with one or more sensors 144. For example, one of the sensors 144 may be a microphone placed in the proximity of the presentation device 120 to receive audio signals corresponding to the media content being presented. The site unit 124 may then process the audio signals received from the microphone 144 to decode any embedded ancillary code(s) and/or generate one or more audio signatures corresponding to a media content being presented. Another of the sensors 144 could be a frequency detector to determine, for example, the channel to which the presentation device 120 is tuned, an infrared (IR) sensor and/or video sensor for monitoring the usage of the presentation device 120, etc. One having ordinary skill in the art will recognize that there are a variety of sensors 144 that may be coupled with the site unit 124 to facilitate generation of viewing records containing sufficient information for the central office to determine a set of desired ratings and/or metering results.

The example home entertainment system 102 also includes a remote control device 160 to transmit control information that may be received by any or all of the set-top box 108, the time-shifting device 112, the presentation device 120 and the site unit 124. One having ordinary skill in the art will recognize that the remote control device 160 may transmit this information using a variety of techniques, including, but not limited to, IR transmission, radio frequency transmission, wired/cabled connection, and the like.

The example local metering system 100 also includes a people meter 164 to capture information about the audience exposed to the media content presented by the presentation device 120. The example people meter 164 may have a set of input keys, each assigned to represent a single viewer, and may prompt the audience members to indicate that they are present in the audience by pressing an appropriate input key. The people meter 164 may also receive information from the site unit 124 to determine a time at which to prompt the audience members. Moreover, the site unit 124 may receive information from the people meter 164 to modify an operation of the site unit 124 (such as to cause the site unit to generate one or more viewing records based on a change in the audience membership).

As will be appreciated by one having ordinary skill in the art, the people meter 164 may receive and/or transmit information using a variety of techniques, including, but not limited to, IR transmission, radio frequency transmission, wired/cabled connection, and the like. As will also be appreciated by one having ordinary skill in the art, the people meter 164 may be implemented by a combination of the remote control device 160 and one or more of the set-top box 108, the time-shifting device 112 and/or the site unit 124. In such an implementation, the set-top box 108, the time-shifting device 112 and/or the site unit 124 may be configured to output prompting information and/or other appropriate people meter content for presentation directly by the presentation device 120. Correspondingly, the remote control device 160 may be configured to accept inputs from the viewing audience and transmit these user inputs to the appropriate device responsible for generating the people meter display on the presentation device 120.

FIG. 2 illustrates an example monitoring system 200 to monitor exposure to media content provided by an example media content delivery system 201. The example media content delivery system 201 of FIG. 2 includes a media source 202 that receives audio/video content from a plurality of content providers 204 and 206. The audio/video content providers 204 and 206 may provide audio and/or video media content or information, such as television programs, advertisements, audio (e.g., radio) programs, still image information (e.g., web pages), etc., in known manners to the media source 202.

The example monitoring system 200 of FIG. 2 includes one or more reference sites 208, a plurality of local metering systems 209 (for example, a set of systems similar or identical to the local metering system 100 of FIG. 1) located at a plurality of home sites 210 (which may be statistically selected to represent a larger population) and a central facility 211 to compile and process data collected by the local metering systems 209. For ease of reference, only one home site 210, one reference site 208 and one central facility 211 is shown in FIG. 2. However, persons of ordinary skill in the art will appreciate that any number of home sites 210, reference sites 208 and/or central data collection and processing facilities 211 may be employed.

The media source 202 transmits one or more signals containing digital and/or analog audio and/or video content information. These signals are received by at least one reference site 208 and at least one statistically selected home site 210 via communication paths or links 212 and 214, respectively. The communication paths or links 212 and 214 may include any combination of hardwired or wireless links, such as satellite links, wireless land-based links, cable links, etc. The signals conveyed via the links 212 and 214 may contain multi-program analog signals and/or digital data streams which are commonly employed within existing media content delivery systems.

In the example monitoring system 200, the reference site 208 includes a plurality of receivers (e.g., set-top boxes or the like) 216, 218 and 220 that simultaneously demodulate, demultiplex and/or decode audio, video and/or other information received from the media source 202. In the illustrated example, each of the receivers 216, 218 and 220 provides audio and/or video information associated with different media content that is currently being broadcast to a reference site processor 222. In other words, the receiver 216 may provide audio and/or video information associated with a media content selection A while the receivers 218 and 220 provide audio and/or video information associated with respective media content selection B and C. In addition, the reference site processor 222 is configured to control each of the receivers 216, 218 and 220 and/or has information indicating a media content selection to which each of the receivers 216, 218 and 220 is tuned at any given time.

The reference site processor 222 may determine the original broadcast date/time stamps, decode reference ancillary code information and/or generate reference signature information for a plurality of simultaneously broadcast audio and/or video content. The reference site processor 222 sends the original broadcast time stamps and the reference code and/or signature information to a central facility processor 224 which stores the original broadcast time stamps and the reference code and/or signature information in a database 226.

The home site 210 could be, for example, a statistically selected home containing a home entertainment system (e.g., such as the example home entertainment system 102 of FIG. 1), a television, a radio, a computer, etc. The home site 210 includes a receiver 228, such as the set-top box 108 of FIG. 1, which may be similar or identical to the receivers 216, 218 and 220. The receiver 228 may also include a time-shifting device, such as the time-shifting device 112 of FIG. 1. Such receivers are well-known and, thus, are not described in greater detail herein. The receiver 228 provides audio and/or video signals 230 to an output device 232 that are used to present the media content currently selected for consumption. In the illustrated example, the output device 232 may be a video display, speaker, etc., such as the presentation device 120 of FIG. 1.

To monitor media content presented by the output device 232, the home site 210 includes the local metering system 209, such as the local metering system 100 of FIG. 1. The local metering system 209 may include, for example, a site unit, such as the site unit 124. The local metering system 209 includes one or more sensors (e.g., such as the sensors 144) that sense, for example, an audio and/or a video signal 234 containing audio and/or video information associated with the currently presented media content. The local metering system 209 uses the signal 234 to decode ancillary code information and/or generate signature information corresponding to the media content currently being presented by the output device 232. The local metering system 209 includes this code and/or signature information in, for example, viewing records that are periodically conveyed to the central facility processor 224.

The central facility processor 224, in addition to being able to perform a variety of other processing tasks, is configured to compare code and/or signature information generated at the home site 210 to the reference code and/or signature information stored in the database 226 to identify the channels and/or media content that was presented at the home site 210. To facilitate the comparison of code and/or signature information received from the reference site 208 to the code and/or signature information received from the home site 210, the reference site processor 222 and the local metering system 209 may generate time stamp information and associate such time stamp information with the code and/or signature information collected at the corresponding time. In this manner, the central facility processor 224 can attempt to align the code and/or signature information received from the reference sites 208 with the code and/or signature information collected at the corresponding times via the home site 210 to thereby reduce the number of comparisons required to identify a match.

Figure 3:
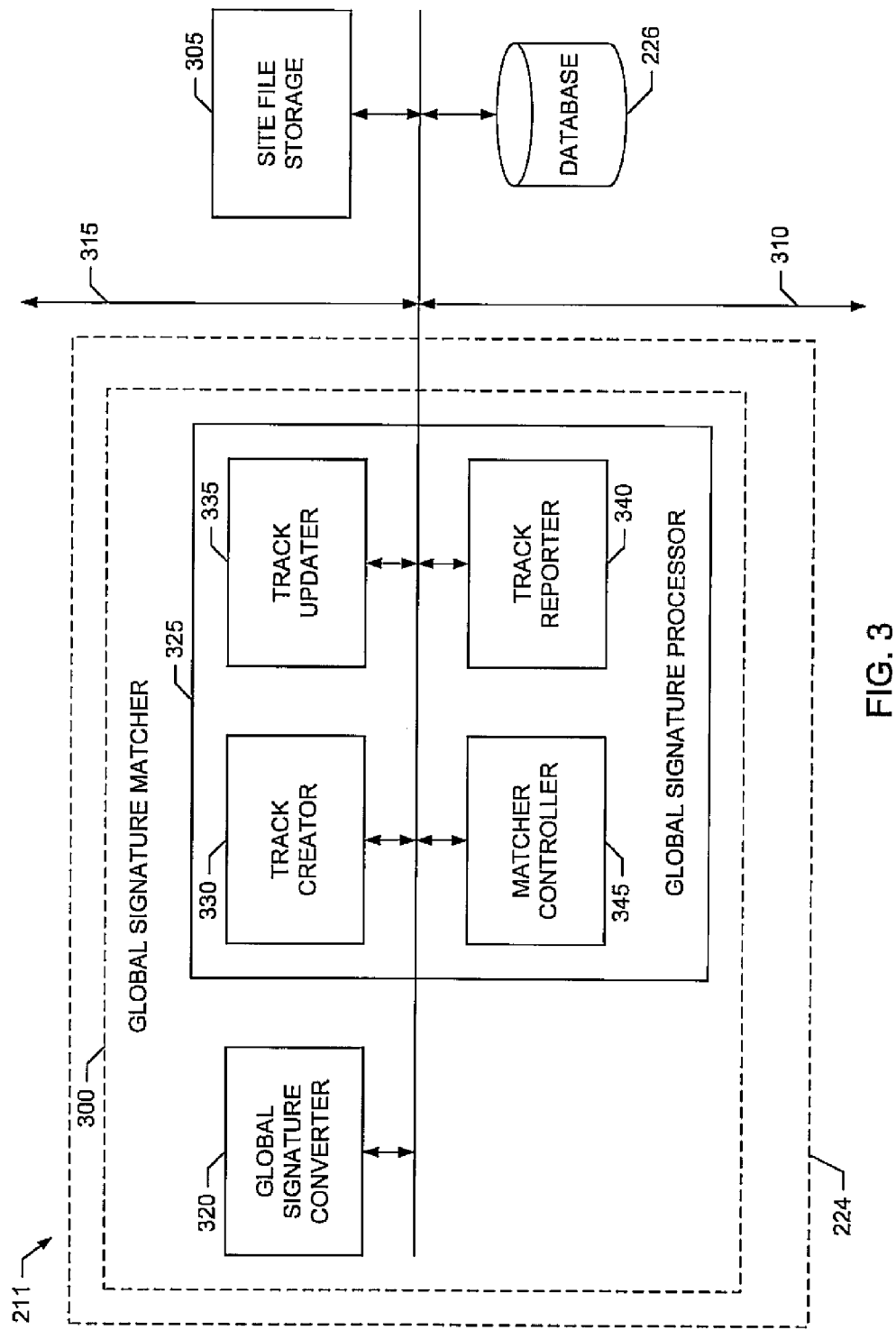
FIG. 3 is a block diagram of an example global signature matcher that may be used to implement the example monitoring system of FIG. 2.

A block diagram of an example global signature matcher 300 that may be used to implement the example central facility processor 224 of FIG. 2 is illustrated in FIG. 3. The example global signature matcher 300 is configured to determine whether one or more site signatures generated by, for example, the local metering system 209 of FIG. 2, and corresponding to media content received by the receiver 228 and presented by the output device 232, match one or more reference signatures generated by, for example, the reference site processor 222, and corresponding to reference content processed by the various reference receivers 216, 218 and 220. When the example global signature matcher 300 determines that a site signature matches a reference signature, the central facility processor 224 of the illustrated example identifies the media content observed at the home site 210 as being the reference media content corresponding to the matching reference signature.

The example global signature matcher 300 of FIG. 3 is configured to obtain the reference signatures from, for example, the database 226 discussed above in connection with FIG. 2. The reference signatures stored in the database 226 are received via a reference interface 310 from, for example, the reference site processor 222. Additionally, the global signature matcher 300 is configured to obtain the site signatures from a site file storage unit 305. The site file storage unit 305 stores site files (e.g., such as the viewing records discussed above in connections with FIG. 1) received via a site interface 315 from, for example, the local metering system 209. For example, if the local metering system 209 corresponds to the local metering system 100 of FIG. 1, which is configured to monitor the home entertainment system 102, then the site files stored in the example site file storage unit 305 include viewing records determined by the example site unit 124 and reported via the connection 140. The viewing records, in turn, include, for example, site signatures and/or codes corresponding to media content presented by the presentation device 120.

The example global signature matcher 300 includes a global signature converter 320 and a global signature processor 325. The global signature processor 325 of the illustrated example further includes a track creator 330, a track updater 335, a track reporter 340 and a matcher controller 345. The example global signature converter 320 converts signatures stored in the database 226 and/or the site file storage 305 into a global signature representation for processing by the example global signature processor 325. Examples of signatures that may be stored in the database 226 and/or the site file storage 305 include signatures generated by the techniques disclosed in International Application Serial No. PCT/US04/10562, titled "Audio Signature Apparatus and Methods," and filed on Apr. 6, 2004. International Application Serial No. PCT/US04/10562 is hereby incorporated by reference in its entirety. Moreover, the example methods and/or apparatus disclosed herein may also be used with any signature (e.g., audio, video, etc.) comprising a sequence of measurements corresponding to occurrences of events and including values (e.g., such as magnitudes, strengths, zero crossing directional indicators, etc.) representative of each such event.

Continuing with the example of FIG. 3, the reference signatures stored in the database 226 and/or the site signatures stored in the site file storage 305 may be represented in, for example, a local signature representation format. In a local signature representation, a signature is represented using a sequence of event data pairs, each pair containing local information used to form the signature. For example, each event data pair may include the value of a signature event of interest (e.g., such as a local peak amplitude event, a zero crossing event, etc.), as well as the time at which the event occurred relative to a previous event of interest. As such, in some example implementations, a signature is represented in the local signature representation format using the following Equation 1:

$$\text{Signature}=[D_0,M_0],\ldots,[D_i,M_i],\ldots,[D_n,M_n]. \quad \text{Equation 1}$$

In Equation 1, $M_i$ represents the value of the $i^{th}$ signature event, and $D_i$ represents the elapsed time between the $i^{th}$ signature event and the previous $(i-1)^{th}$ signature event of interest.

The example global signature converter 320 converts input signatures represented in a first format (e.g., such as in a local signature representation) to signatures having a global signature representation. In a global signature representation, a signature is represented using a sequence of event data pairs in which each data pair includes the value of a signature event of interest, as well as the absolute time the signature event occurred relative to the first data pair in the sequence. As such, in some example implementations, the global signature representation for a particular signature is given by the following Equation 2:

$$\text{Signature}=[T_0,M_0],\ldots,[T_i,M_i],\ldots[T_n,M_n] \quad \text{Equation 2}$$

In Equation 2, $M_i$ represents the value of the $i^{th}$ signature event, and $T_i$ represents the absolute time for the $i^{th}$ event data pair relative to the first data pair $[T_0, M_0]$.

For example, if an input signature to the example global signature converter 320 is represented in the local signature representation format of Equation 1, then the global signature representation of the signature is given by the following Equation (3):

$$\text{Signature} = [T_0 = D_0, M_0], \ldots, \left[T_i = \sum_{j=0}^{i} D_j, M_i\right], \ldots, \left[T_n = \sum_{j=0}^{n} D_j, M_n\right]. \quad \text{Equation 3}$$

In Equation 3, the absolute time $T_i$ for the $i^{th}$ event data pair is determined by accumulating the time differences $D_j$ for all data pairs from the initial data pair $[D_0, M_0]$ to the $i^{th}$ event data pair $[D_i, M_i]$.

The global signature representations of Equation 2 and Equation 3 are well-suited to processing and matching non-event (e.g., silence) intervals in a signature. As an illustrative example, assume that an example signature has a local signature representation given by the following Equation 4:

$$\text{Signature(Time Diff)}=[32,100][255,0][255,0][255,50][45,200]. \quad \text{Equation 4}$$

In Equation 4, the data pairs [255, 0] correspond to a non-event (e.g., silence) interval spanning the maximum time difference (e.g., 255) that may occur between events and, thus, do not correspond to actual events themselves. Instead, the data pairs [255, 0] function as placeholders to specify the length of a non-event interval. A potential drawback of the local signature representation of Equation 4 is that a second signature also represented in the local signature representation format and having some data pairs of [255, 0] may be deemed to at least partially match the first signature of Equation 4 even though the overall spans of the non-event intervals for the two signatures do not substantially align.

However, improved matching accuracy and/or efficiency may result through use of the global signature representation. Continuing the illustrative example, the example global signature converter 320 may convert the local signature representation of Equation 4 into the global signature representation of the following Equation 5:

$$\text{Signature(GSR)}=[32,100][797,50][842,200]. \quad \text{Equation 5}$$

It is important to note that non-event data pairs (e.g., such as the data pair [255, 0]) are no longer needed in the global signature representation of Equation 5 as the non-event time interval represented by these data pairs is now subsumed in the absolute time values of the global signature representation event data pairs. For example, based on the global signature representation of Equation 5, the non-event interval in the example signature is known to span the absolute time interval from 32 to 797. As such, a second signature formatted in a global signature representation may not be deemed to match the first signature of Equation 5 unless the second signature also has a non-event interval that substantially spans the absolute time interval from 32 to 797. Thus, a global signature representation may enhance matching accuracy by allowing direct comparison of the overall spans of the non-event (e.g., silence) intervals for two (or more) signatures to determine whether the overall spans substantially align before declaring a potential match.

Additionally, the global signature representation further enhances matching accuracy because minor, and potentially disregarded, discrepancies between two signatures formatted using local signature representations are aggregated into larger, more noticeable, discrepancies when the signatures are reformatted into global signature representations. The aggregation effect of converting a local signature representation to a global signature representation reduces the likelihood of matching errors relative to signatures compared using local signature representations. Furthermore, the global signature representation can result in a more compact data representation for a signature as compared to the local signature representation because, for example, the extraneous non-event data pairs are not needed in the global signature representation.

The global signature processor 325 of the illustrated example processes reference signatures stored in the database 226 and site signatures stored in the site file storage 305 to determine whether one or more site signatures match one or more reference signatures. Additionally, the global signature processor 325 of the illustrated example is configured to process the site and reference signatures after conversion into global signature representations by the example global signature converter 320. To compare one or more site signatures stored in the site file storage 305 to one or more reference signatures stored in the database 226, the global signature processor 325 of the illustrated example creates and updates one or more "tracks." Each track corresponds to a particular reference content source at a particular time. Furthermore, a particular track represents the history of comparing one or more site signatures to one or more reference signatures corresponding to the particular reference content source associated with the track. As such, when the site signatures for content observed, for example, at the home site 210 coincide with a particular reference content source, the track for that reference content source will indicate the successful matches between the site signatures and the reference signatures for that particular reference content source at that particular time. When the observed content at the home site 210 subsequently changes, the track for the particular reference content source will then indicate substantially no further matches between the site signatures and the reference signatures for that particular reference content source.

To create and update the one or more tracks corresponding to the one or more reference content sources represented by the reference signatures stored in the database 226, the global signature processor 325 of the illustrated example includes the track creator 330 and the track updater 335. The example track creator 330 initially creates tracks for one or more reference content sources represented by the reference signatures stored in the database 226. For example, the track creator 330 of the illustrated example may be configured to create tracks for only those reference content sources at particular times for which one or more of their reference signatures partially or substantially match a particular site signature obtained from the site file storage 305 and currently undergoing processing. Additionally or alternatively, the track creator 330 of the illustrated example could be configured to attempt to create tracks for reference content sources in a specified order of priority.

For example, the track creator 330 could be configured to first attempt to create a track for at least one of the reference content sources by comparing current reference signatures corresponding to live viewing of media content. After some number of attempts, if no tracks are able to be created for live viewing of media content from the available reference content sources, the track creator 330 could be configured to then attempt to create a track for at least one of the reference content sources by comparing past reference signatures corresponding to delayed viewing of media content. For example, the track creator 330 could initially examine a short window (e.g., 1-2 hours) of past reference signatures corresponding to viewing of paused/rewound media content output by, for example, the time-shifting device 112. Next, if no tracks are able to be created for this short window, a longer window (e.g., 1-3 days) of past reference signatures corresponding to previously recorded and later viewed media content could be examined. Finally, if after some number of attempts no tracks are able to be created for past viewing of media content from the available reference content sources, the track creator 330 could be configured to then attempt to create a track for any of the other reference content sources at any available time.

After one or more tracks are created by the example track creator 330, the track updater 335 of the illustrated example continues to process and update the existing tracks. For example, the track updater 335 of the illustrated example may be configured to compare one or more site signatures from the site file storage 305 (e.g., after conversion by the global signature converter 320) to the next appropriate one or more reference signatures corresponding to reference content source(s) for which track(s) have been created. Such already existing tracks may be referred to as "active" or "live" tracks. When the one or more site signatures match one or more reference signatures corresponding to the live track, the track updater 335 of the illustrated example maintains the track in a "live" state and updates the live track to indicate the match success(es). However, when a predetermined number of site signatures do not match one or more reference signatures corresponding to the live track, the track updater 335 of the illustrated example indicates that the track is no longer "live" and updates the track to indicate the match failure(s). This predetermined number of site signatures may be set to correspond to, for example, an expected maximum duration of local commercial content in a national broadcast feed (e.g., such as two minutes), a specified duration of tolerable audio disruption, etc.

To determine whether a particular site signature matches (e.g., substantially, partially, etc.) a particular reference signature, both the example track creator 330 and the example track updater 335 determine a distance between the site signature and the reference signature. Additionally, to support identification of time-shifted content observation (e.g., such as content provided by the example time-shifting device 112 of FIG. 1), the example track creator 330 and the example track updater 335 determine an offset (e.g., shift) corresponding to the best alignment/distance between the site signature and the reference signature. An example distance metric that may be used by the example track creator 330 and/or the example track updater 335 to determine a distance between a first signature $S_1$ and a second signature $S_2$ for a particular alignment (or shift) is given by the following Equation 6:

$$d(S_1, S_2) = C\left(1 - \frac{Z}{M}\right). \quad \text{Equation 6}$$

In Equation 6, M represents the maximum of the number of data pairs in the first signature $S_1$ and the number of data pairs in the second signature $S_2$. Z represents the number of data pairs that match (e.g., that align in time) between the first signature $S_1$ and the second signature $S_2$ for the particular alignment (or shift). The constant C is provided to enable the distance value to be scaled to lie in a particular desired range of values.

In some example implementations, to determine the distances between a particular site signature and a particular reference signature for a plurality of offsets (or shifts), the example track creator 330 and/or the example track updater 335 determine a difference histogram for the particular site and reference signatures. The difference histogram stores the number of event data pairs that align between particular site and reference signatures for different offsets (shifts). Then, the example track creator 330 and/or the example track updater 335 finds all entries of the histogram having at least a specified number of data pair alignments (which also corresponds to an allowable distance between the site and reference signatures) and determines the offsets (shifts) between the particular site and reference signatures for each of these corresponding matches. If such entries are found, the particular site and reference signatures are deemed to match for each of the corresponding offsets (shifts). If no entry is found having at least the specified number of data pair alignments, the particular site and reference signatures are deemed not to match.

Figure 4:
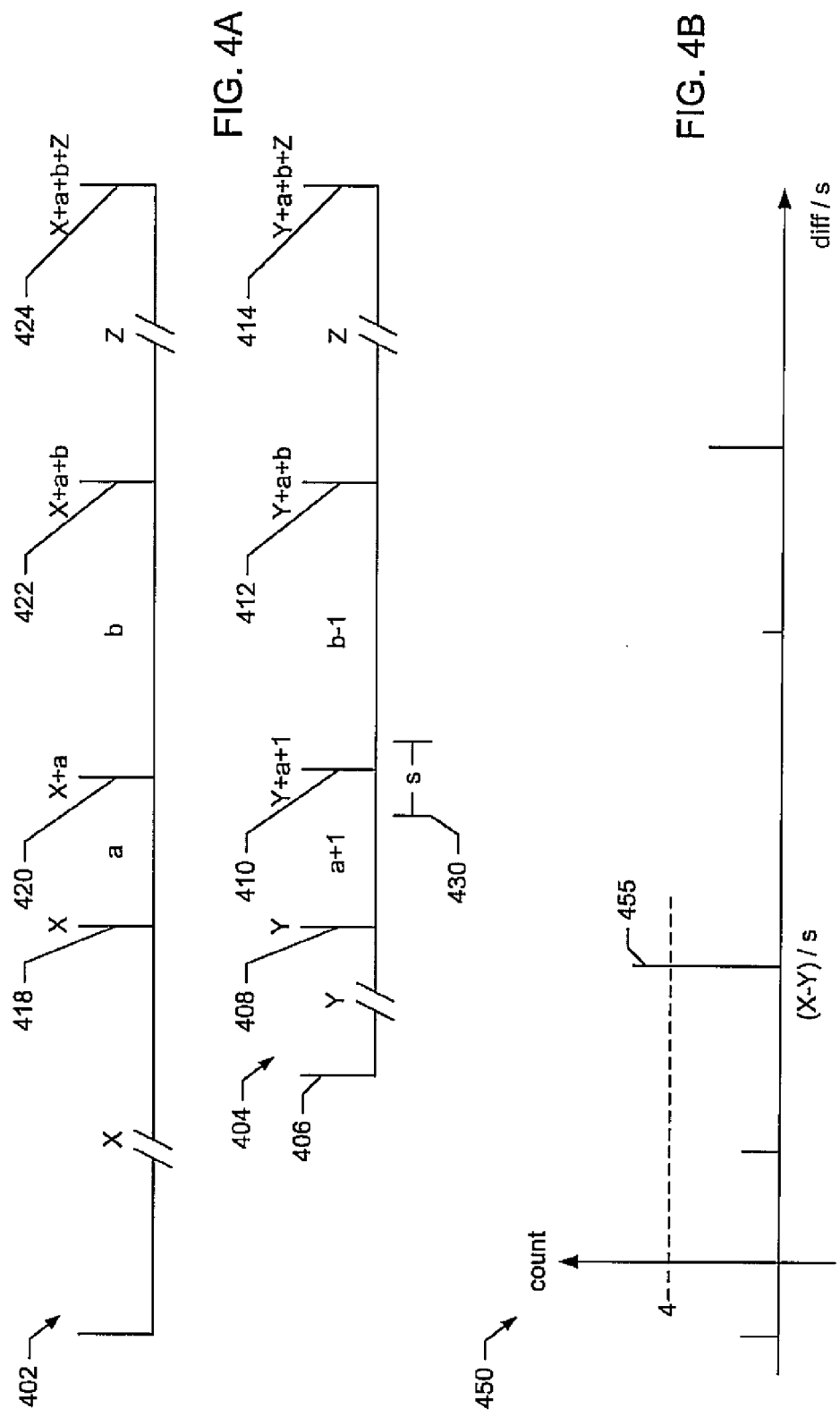
FIG. 4A illustrates an example reference signature and an example site signature that may be processed by the example global signature matcher of FIG. 3.
FIG. 4B illustrates an example difference histogram that may be determined by the example global signature matcher of FIG. 3 based on the example site signature and the example reference signature of FIG. 4A.

In implementations in which the distance metric of Equation 6 is used to determine the distance between the site and reference signature, the difference histogram may, alternatively, represent the distance between the particular site and reference histograms for each relevant offset of the two signatures. In such implementations, the example track creator 330 and/or the example track updater 335 finds the all entries of the histogram having no greater than a specified distance and determines the offsets (shifts) between the particular site and reference signatures for each of these corresponding matches. If such entries are found, the particular site and reference signatures are deemed to match for each of the corresponding offsets (shifts). If no entry is found having a distance not greater than the specified distance, the particular site and reference signatures are deemed not to match FIGS. 4A-4B collectively illustrate the determination of an example difference histogram by the example track creator 330 and/or the example track updater 335. In particular, FIG. 4A provides graphical illustrations of an example reference signature 402 and an example site signature 404, both stored in a global signature representation. For both the example reference signature 402 and the example site signature 404, the horizontal axis represents absolute time relative to the start of the respective signature. Each vertical line represents a data pair (for convenience, and without loss of generality, the data pairs all have the same magnitude). The alignment (or shift) of the site signature 404 may be varied relative to the reference signature 402 by varying the starting time of the first data pair 406 in the site signature 404. From Equation 2 and Equation 3 discussed above, the absolute times of the remaining data pairs 408, 410, 412 and 414 are offset by the offset applied to the first data pair 406. As shown in the example of FIG. 4A, when an offset of (X−Y) is applied to the first data pair 406 in the site signature 404, the remaining data pairs 408, 410, 412 and 414 of the site signature 404 substantially align with the data pairs 418, 420, 422 and 424 of the reference signature 402.

A window 430 having, for example, a width s may be used to determine whether, for a given shift, a particular data pair of the site signature 404 substantially aligns with a corresponding data pair of the reference signature 402. The window 430 compensates for timing discrepancies between, for example, the local metering system 209, which generated the site signature 404, and the reference site processor 222, which generated the reference signature 402. In the example of FIG. 4A, the window 430 enables the example track creator 330 and/or the example track updater 335 to determine that the data pair 410 of the site signature 404 is substantially aligned with the data pair 420 of the reference signature 402 even though the two data pairs are offset by one time unit for the illustrated shift.

In some example implementations, the time window 430 may be implemented by determining scaled time values for each of the data pairs of the reference signature 402 and the site signature 404. The scaled time values are determined by dividing each of the time values in the data pairs by the width of the window 430 (e.g., s in the illustrated example of FIG. 4A) and then truncating the result to be an integer value (e.g., by discarding any fractional remainder). In this way, time values within the width of the sample window 430 will have the same scaled time value and, thus, will align in the new scaled time domain. In other implementations, the time window 430 may be implemented during comparison of each data pair of the reference signature 402 with each data pair of the site signature 404. In such implementations, the time difference between a data pair of the reference signature 402 and a data pair of the site signature 404 is scaled through division by the width of the window 430 (e.g., s in the illustrated example of FIG. 4A). The scaled time difference is then truncated to be an integer value (e.g., by discarding any fractional remainder). The resulting truncated scaled difference represents the offset (shift) between the particular data pair of the reference signature 402 and the particular data pair of the site signature 404 in multiples of the window 430. In either type of implementation, the window 430 reduces the search space by a factor of s for determining the offset (shift) yielding the maximum number of data pair alignments between the reference signature 402 and the site signature 404.

An example difference histogram 450 that may be determined by the example track creator 330 and/or the example track updater 335 based on the example reference signature 402 and the example site signature 404 is illustrated in FIG. 4B. In the example histogram 450, the horizontal axis represents shifts (or "differences") between the example site signature 404 and the example reference signature 402. The vertical axis represents the number of data pairs that match (e.g., are aligned in time) between the example site signature 404 and the example reference signature 402 for a particular shift (or difference) (e.g., consistent with an example implementation based on the example distance metric of Equation 6). Furthermore, in the example difference histogram 450, the window 430 is used to determine whether data pairs in the example site signature 404 and the example reference signature 402 are substantially aligned (e.g., as evidenced by the horizontal axis being scaled by the window width s).

Figure 13A:
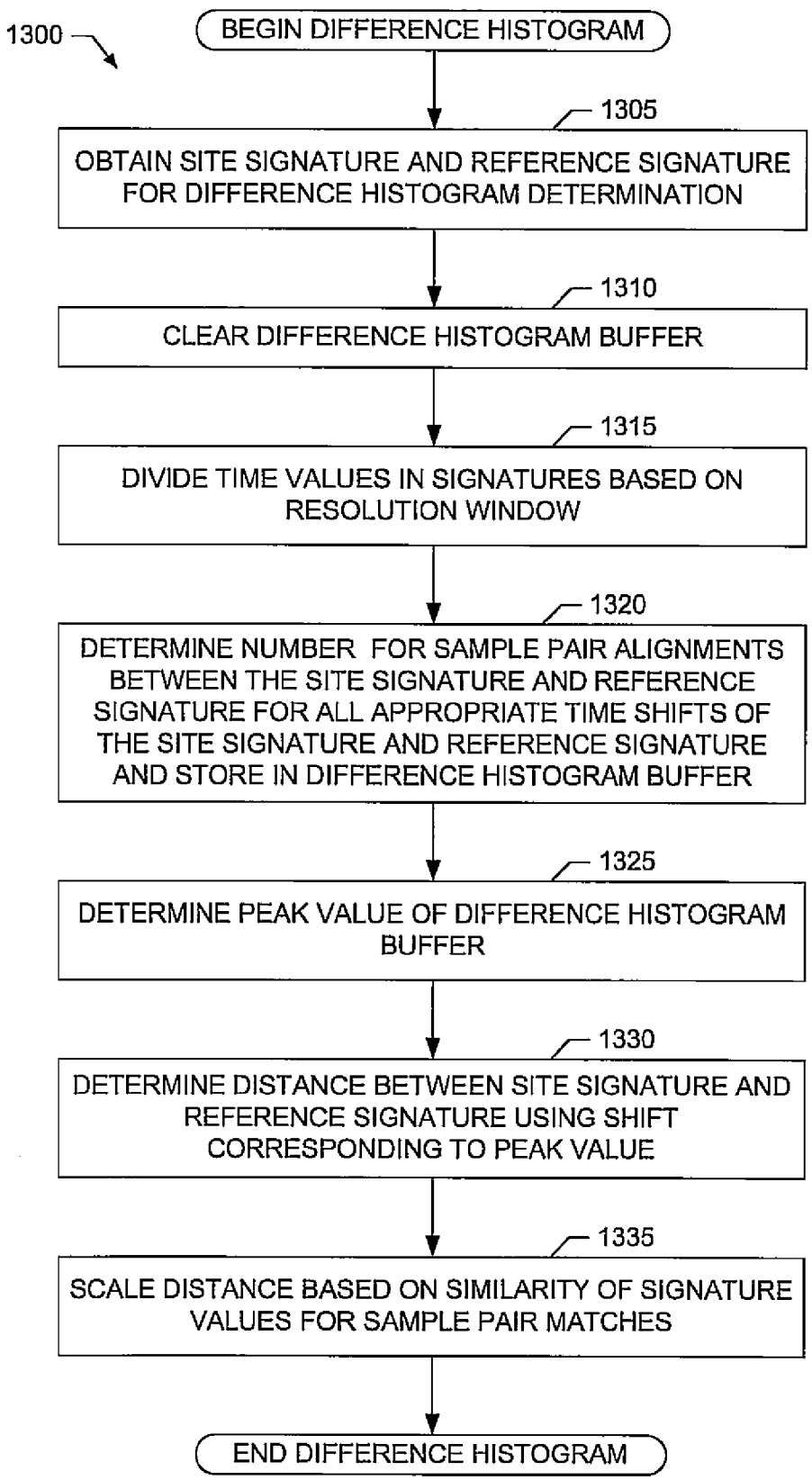
FIG. 13A is a flowchart representative of a first example process that may be used to determine difference histograms to implement the example global signature matcher of FIG. 3.
Figure 13B:
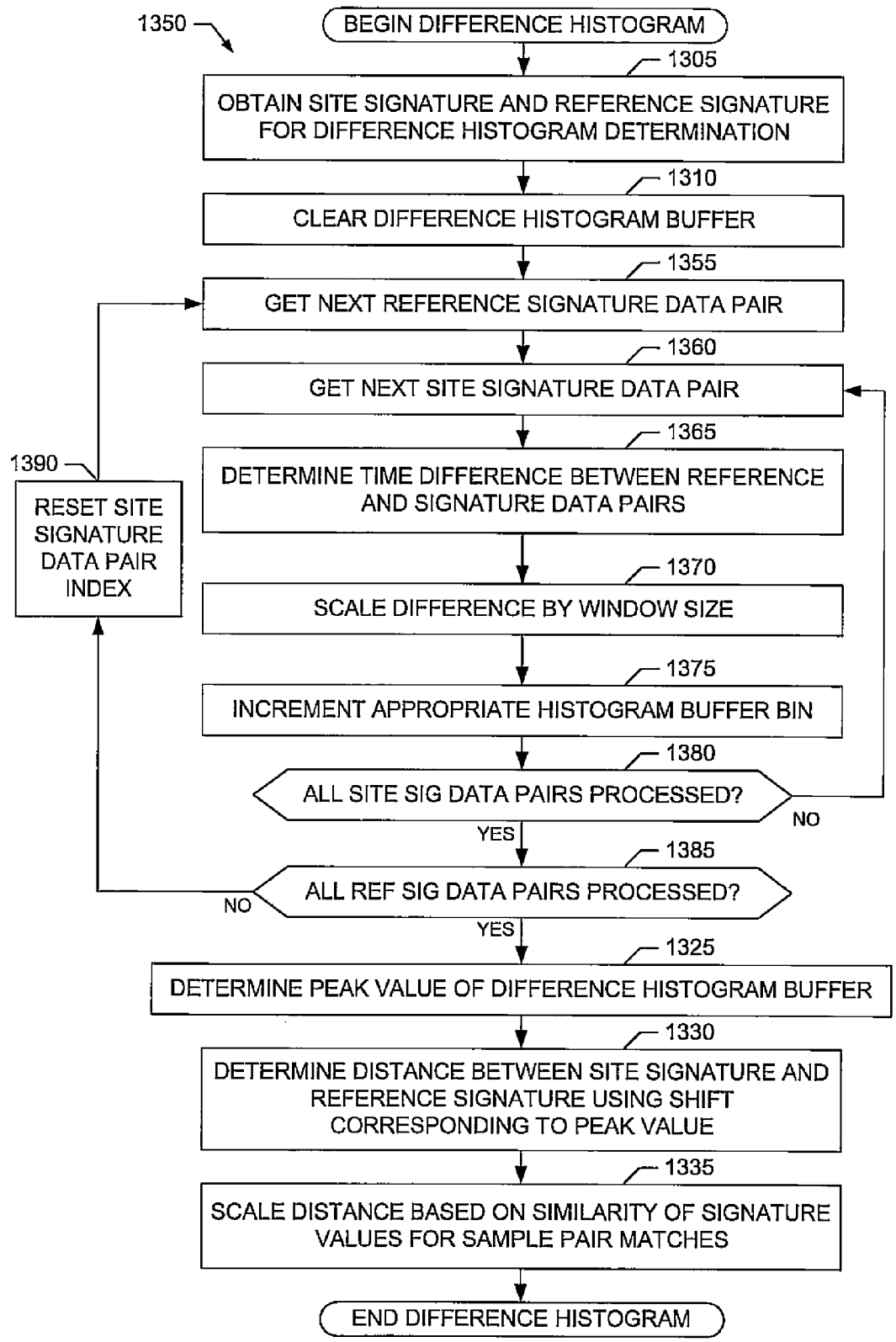
FIG. 13B is a flowchart representative of a second example process that may be used to determine difference histograms to implement the example global signature matcher of FIG. 3.

As expected, in the illustrated example, the peak 455 of the example difference histogram 450 coincides with an offset of (X−Y) (scaled by s to implement the window 430). The peak 455 has a value of at least four (4) corresponding to the four data pairs 408, 410, 412 and 414 of the site signature 404 that substantially align with the four data pairs 418, 420, 422 and 424 of the reference signature 402. A first example process 1300 that may be executed, for example, by the example track creator 330 and/or the example track updater 335 to determine the example difference histogram 450 is illustrated in FIG. 13A and discussed in greater detail below. A second example process 1350 that may be executed, for example, by the example track creator 330 and/or the example track updater 335 to determine the example difference histogram 450 is illustrated in FIG. 13B and discussed in greater detail below.

The example global signature processor 325 further includes the example track reporter 340 to report the tracks created and updated by, respectively, the example track creator 330 and the example track updater 335. The example track reporter 340 reports the tracks, for example, to the central facility processor 224 for subsequent processing. For example, the central facility processor 224 may use the reported tracks to determine which media content is being observed at the home site 210 by associating the reference media content corresponding to reported live tracks with the actual media content observed at the home site 210. As such, the track reporter 340 of the illustrated example may report a track when it is created by the example track creator 330, updated by the example track updater 335, determined to no longer be a live track by the example track updater 335, etc.

Additionally, the example global signature processor 325 includes the example matcher controller 345. The example matcher controller 345 controls, for example, the operation of the example global signature processor 325, the interfacing of the example global signature processor 325 with the global signature converter 320, etc. For example, the matcher controller 345 controls the activation and operation of the example track creator 330, the example track updater 335 and the example track report 340, as well as the interaction of these apparatus with the example global signature converter 320, the site file storage 305, the database 226, etc.

While an example manner of implementing the global signature matcher 300 has been illustrated in FIG. 3, one or more of the elements, processes and/or devices illustrated in FIG. 3 may be combined, divided, re-arranged, omitted, eliminated and/or implemented in any other way. Further, the example global signature converter 320, the example global signature processor 325, the example track creator 330, the example track updater 335, the example track reporter 340, the example matcher controller 345 and/or, more generally, the example global signature matcher 300 of FIG. 3 may be implemented by hardware, software, firmware and/or any combination of hardware, software and/or firmware. Thus, for example, any of the example global signature converter 320, the example global signature processor 325, the example track creator 330, the example track updater 335, the example track reporter 340, the example matcher controller 345 and/or, more generally, the example global signature matcher 300 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software implementation, at least one of the example global signature matcher 300, the example global signature converter 320, the example global signature processor 325, the example track creator 330, the example track updater 335, the example track reporter 340 and/or the example matcher controller 345 are hereby expressly defined to include a tangible medium such as a memory, digital versatile disk (DVD), compact disk (CD,) etc. Further still, the example global signature matcher 300 of FIG. 3 may include one or more elements, processes and/or devices in addition to, or instead of, those illustrated in FIG. 3, and/or may include more than one of any or all of the illustrated elements, processes and devices.

Flowcharts representative of example processes that may be executed to implement the example global signature matcher 300, the example global signature converter 320, the example global signature processor 325, the example track creator 330, the example track updater 335, the example track reporter 340 and/or the example matcher controller 345 of FIG. 3 are shown in FIGS. 5-12, 13A and 13B. In these examples, the process represented by each flowchart may be implemented by one or more programs comprising machine readable instructions for execution by: (a) a processor, such as the processor 1412 shown in the example computer 1400 discussed below in connection with FIG. 14, (b) a controller, and/or (c) any other suitable device. The one or more programs may be embodied in software stored on a tangible medium such as, for example, a flash memory, a CD-ROM, a floppy disk, a hard drive, a DVD, or a memory associated with the processor 1412, but the entire program or programs and/or portions thereof could alternatively be executed by a device other than the processor 1412 and/or embodied in firmware or dedicated hardware (e.g., implemented by an application specific integrated circuit (ASIC), a programmable logic device (PLD), a field programmable logic device (FPLD), discrete logic, etc.). For example, any or all of the example global signature matcher 300, the example global signature converter 320, the example global signature processor 325, the example track creator 330, the example track updater 335, the example track reporter 340 and/or the example matcher controller 345 could be implemented by any combination of software, hardware, and/or firmware. Also, some or all of the processes represented by the flowcharts of FIGS. 5-12, 13A and 13B may be implemented manually. Further, although the example processes are described with reference to the flowcharts illustrated in FIGS. 5-12, 13A and 13B, many other techniques for implementing the example methods and apparatus described herein may alternatively be used. For example, with reference to the flowcharts illustrated in FIGS. 5-12, 13A and 13B, the order of execution of the blocks may be changed, and/or some of the blocks described may be changed, eliminated, combined and/or subdivided into multiple blocks.

Figure 5:
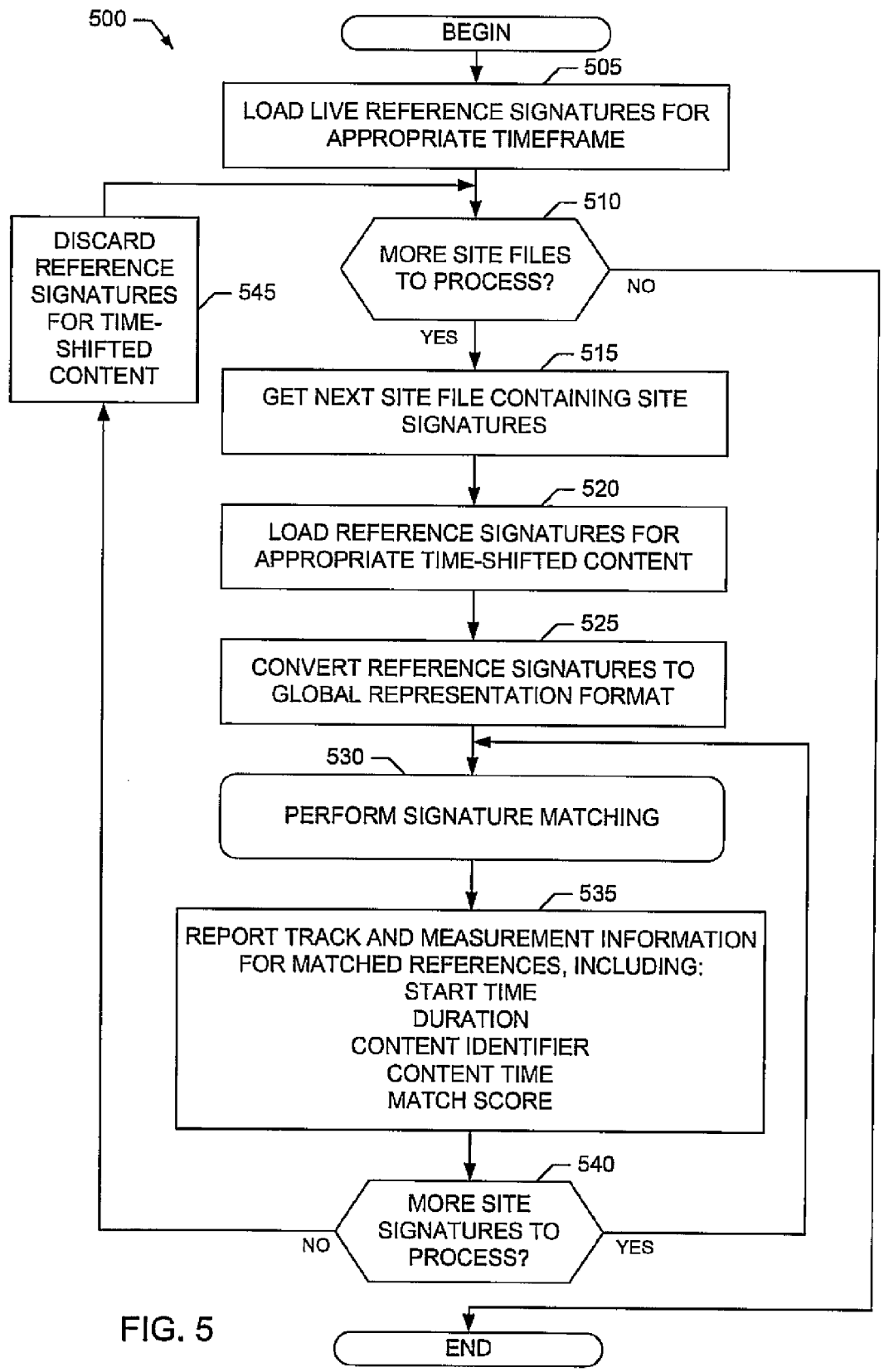
FIG. 5 is a flowchart representative of an example process that may be performed to implement the example global signature matcher of FIG. 3.

An example process 500 that may be executed to implement the example global signature matcher 300 of FIG. 3 is illustrated in FIG. 5. The example process 500 may be executed at predetermined intervals (e.g., such as hourly, daily, etc.), based on occurrence(s) of predetermined event(s) (e.g., such as when a particular number of site files have been added to the site file storage 305), etc., or any combination thereof. The process 500 begins execution at block 505 at which the example global signature matcher 300 begins obtaining reference signatures corresponding to reference media content in a preferred hierarchical order. In particular, at block 505 the example global signature matcher 300 obtains the reference signatures corresponding to live (e.g., broadcast on the date that the site files were collected) reference media content sources from, for example, the database 226. The reference signatures obtained at block 505 are generated by, for example, the reference site processor 222, and correspond to live (e.g., broadcast on the date that the site files were collected) reference content processed by one or more of the various reference receivers 216, 218 and 220.

Next, control proceeds to block 510 at which the example global signature matcher 300 determines whether there are remaining site files in the site file storage 305 that need to be processed. The site files stored in the site files storage 305 include site signatures (e.g., such as signatures determined by the site unit 124 and reported in the form of viewing records) corresponding to local media content observed, for example, at the home site 210. If there are no remaining site files to process (block 510), execution of the example process 500 then ends. However, if there are remaining site files to process (block 510), control proceeds to block 515 at which the example global signature matcher 300 obtains the next site file from the site file storage 305 containing site signatures to be processed.

Control then proceeds to block 520 at which the example global signature matcher 300 obtains the reference signatures corresponding to appropriate time-shifted reference media content from, for example, the database 226. As the reference signatures obtained at block 520 correspond to time-shifted (e.g., paused or delayed) content, they will typically correspond to some appropriate past timeframe (e.g., such as reference signatures corresponding to reference content broadcast more than some specified minutes, hours or days ago). Furthermore, the time-shifted reference signatures obtained at block 520 may be further tailored to correspond to a limited, appropriate subset of all of the possible time-shifted reference content. For example, at block 520 the example global signature matcher 300 may retrieve time-shifted reference signatures corresponding to only that media content observed at the home site 210 within a previous recent interval of time. The example global signature matcher 300 may limit its retrieval in this way because it may be likely that any time-shifted media content observed at the home site 210 will correspond to the time-shifting (e.g., pausing or rewinding via the time-shifting device 112) of recently broadcast live content.

After the example global signature matcher 300 retrieves the appropriate time-shifted reference signatures at block 520, control proceeds to block 525 at which the example global signature converter 320 converts the reference signature(s) obtained at blocks 505 and/or 520, and the site signature(s) obtained at block 515, to their corresponding global signature representation format. In an alternative implementation, the reference signatures are converted into global signature representations when they are received by the central facility processor 224 and stored in the database 226. In such an alternative implementation, the reference signature(s) obtained at blocks 505 and/or 520 are already formatted in a global signature representation and, thus, block 525 is no longer needed, thereby reducing computational overhead. The global signature representation format is discussed in greater detail above in connection with FIG. 3. Next, control proceeds to block 530 at which the example global signature matcher 300 performs signature matching to determine whether the one or more site signatures obtained at block 515 match one or more of the reference signatures obtained at block 505 and 520 (e.g., after global signature representation conversion at block 525).

Furthermore, as part of the signature matching at block 530, the example global signature matcher 300 creates and/or updates one or more tracks corresponding to the one or more reference content sources for which the site and reference signatures match. As discussed above in connection with FIG. 3, each track corresponds to a particular reference content source and represents the history of comparing one or more site signatures to one or more reference signatures corresponding to that particular reference content source. As such, tracks may used to determine whether local content observed, for example, at the home site 210 corresponds to any reference content sources processed, for example, by the reference site processor 222. An example process that may be executed to perform the processing at block 530 is illustrated in FIG. 6 and discussed in greater detail below.

After the signature matching at block 530 completes, control proceeds to block 535 at which the example track reporter 340 reports the tracks created and/or updated at block 530. For example, at block 535 the example track reporter 340 reports the start time and duration for each track. Additionally, the example track reporter 340 reports information identifying the particular reference content source corresponding to the reported track and the time at which the reference content, for example, was originally broadcast, made available to the home site 210, etc. The example track reporter 340 also reports a matching score for the track. The matching score may be based on, for example, the distance and/or number of data pairs that match between the site and reference signatures reported in the track, the relative closeness of the values of the site and reference signatures for data pairs that match, etc.

Next, control proceeds to 540 at which the example global signature matcher 300 determines whether there are remaining site signatures to process in the site file obtained at block 515. If there are remaining site signatures in the site file to process (block 540), control returns to block 530 and blocks subsequent thereto at which the example global signature matcher 300 performs signature matching for one or more remaining site signatures in the site file. If, however, there are no remaining site signatures in the site file to process (block 540), control proceeds to block 545 at which the time-shifted reference signatures associated with the site file being processed are discarded. Control then returns to block 510 and blocks subsequent thereto at which the example global signature matcher 300 processes the next site file, if any site files are remaining in the site file storage 305.

Figure 6:
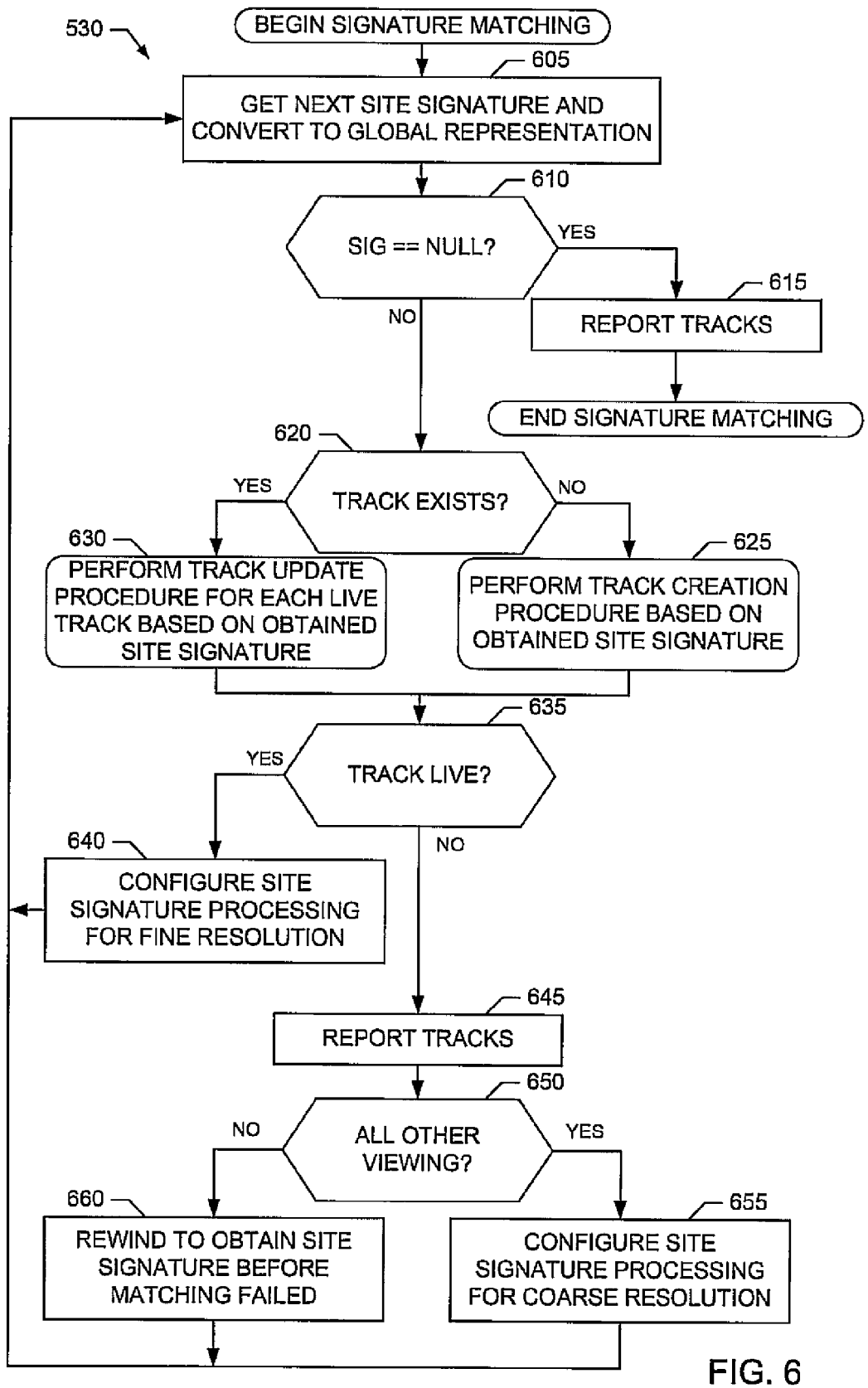
FIG. 6 is a flowchart representative of an example process for signature matching that may be used to implement the example process of FIG. 5 and/or that may be executed to implement the example global signature matcher of FIG. 3.

An example process 530 that may be executed to implement the signature matching processing at block 530 of FIG. 5 and/or to implement the example global signature processor 325 and/or the example global signature matcher 300 of FIG. 3 is illustrated in FIG. 6. Execution of the example process 530 begins at block 605 at which the example global signature processor 325 obtains the next site signature for processing (e.g., from a site file stored in the site file storage 305). At block 605, the example global signature processor 325 also invokes the example signature converter 320 to convert the site signature into a global signature representation (e.g., if such conversion was not already performed at, for example, block 525 of FIG. 5).

Next, control proceeds to block 610 at which the example matcher controller 345 determines whether the site signature obtained at block 605 is a NULL signature indicating that there are no remaining signatures to process. If the site signature is the NULL signature (block 610), control proceeds to block 615 at which the example track reporter 340 reports information concerning the tracks currently being maintained (e.g., created, updated, recently deactivated, etc.) by the example global signature processor 325. Additionally or alternatively, the example track reporter 340 may report the track information outside of the processing performed by the example process 530 (e.g., such as at block 535 of FIG. 5), thus allowing block 615 to be eliminated from the example process 530 of FIG. 6. After the reporting at block 615 completes, execution of the example process 530 then ends.

Figure 8:
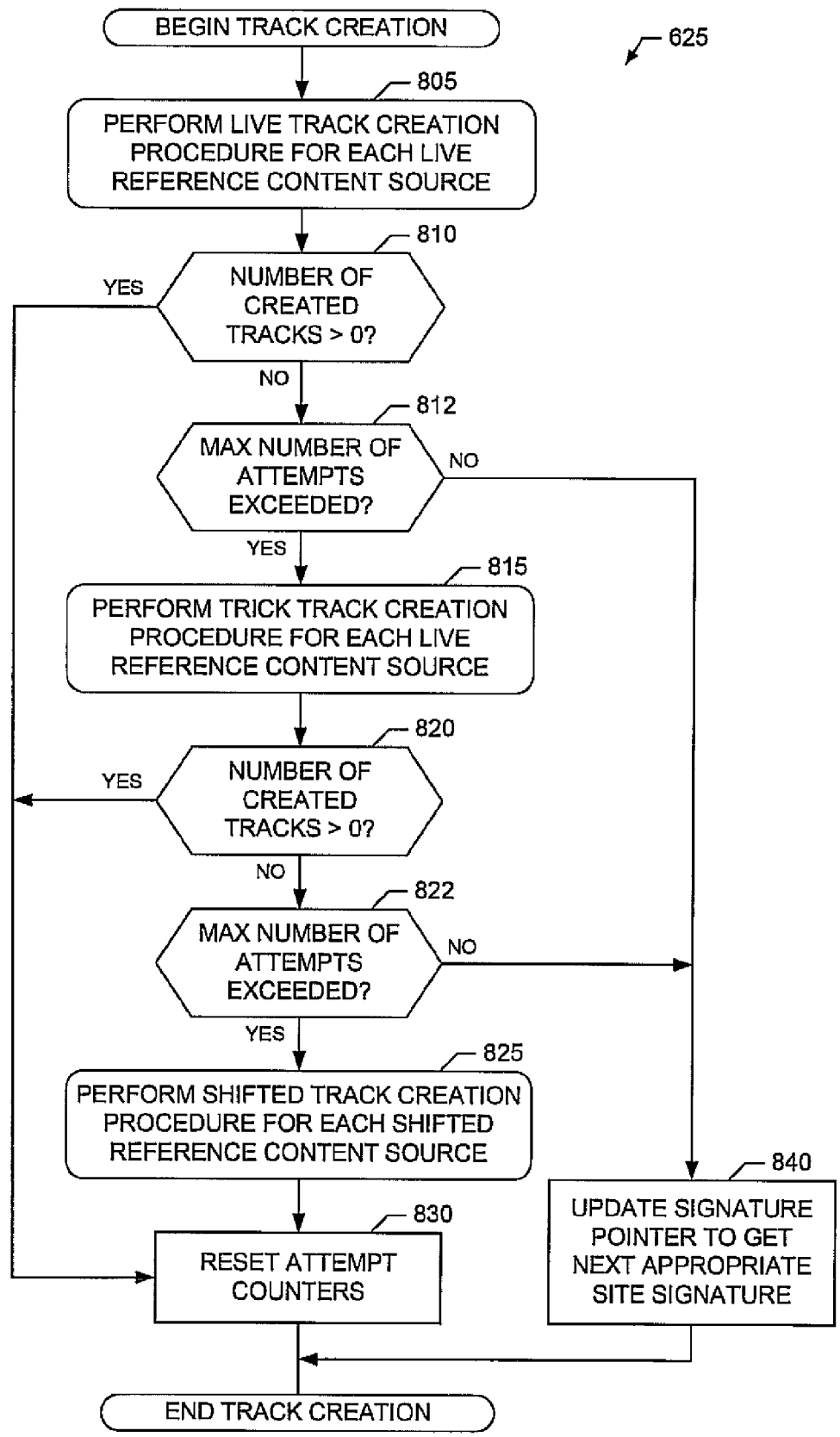
FIG. 8 is a flowchart representative of an example process for track creation that may be used to implement a portion of the example process of FIG. 6 and/or that may be executed to implement the example global signature matcher of FIG. 3.

However, if the site signature is not the NULL signature (block 610), control proceeds to block 620 at which the example matcher controller 345 determines whether any tracks currently exist or, in other words, are currently being maintained by the example global signature processor 325. If no tracks currently exist (block 620), control proceeds to block 625 at which the example track creator 330 performs a track creation procedure to create one or more new tracks, if appropriate, based on the site signature obtained at block 605. For example, at block 625 the example track creator 330 may create tracks for one or more reference content sources having reference signatures that match (e.g., substantially, partially, etc.) the site signature obtained at block 605. An example process that may be executed to perform the processing at block 625 is illustrated in FIG. 8 and discussed in greater detail below.

Figure 7:
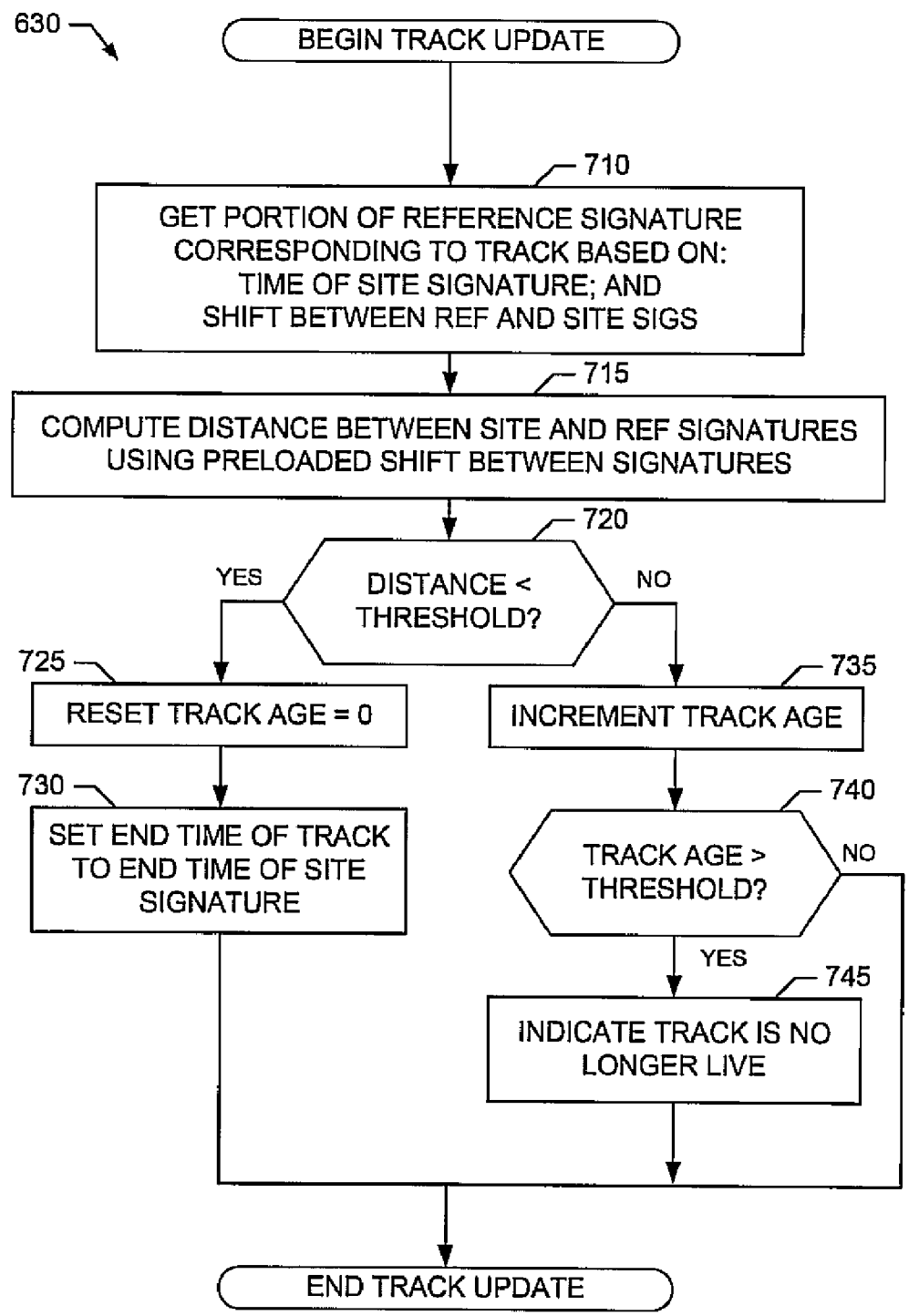
FIG. 7 is a flowchart representative of an example process for track updating that may be used to implement a portion of the example process of FIG. 6 and/or that may be executed to implement the example global signature matcher of FIG. 3.

If, however, one or more tracks currently exist (block 620), control proceeds to block 630 at which the example track updater 335 performs a track update procedure to update the one or more existing tracks based on the site signature obtained at block 605. For example, at block 630 the example track updater 335 will augment tracks for one or more reference content sources if the site signature obtained at block 605 matches the reference signature(s) associated with the one or more reference content sources. Furthermore, the example track updater 335 will indicate that such tracks are still live. Additionally, at block 630 the example track updater 335 may indicate that one or more tracks are no longer live (e.g., are deactivated) if the one or more reference content sources corresponding to those tracks have reference signatures that do not match a predetermined number of site signatures obtained consecutively at block 605. An example process that may be executed to perform the processing at block 630 is illustrated in FIG. 7 and discussed in greater detail below.

After the track creation procedure completes at block 625 or the track update procedure completes at block 630, control proceeds to block 635. At block 635, the example matcher controller 345 determines whether there are any live tracks currently being maintained by the example global signature processor 325. If there are one or more live tracks currently being maintained by the example global signature processor 325 (block 635), control proceeds to block 640 at which the example matcher controller 345 configures the example global signature processor 325 for fine resolution processing. In some example implementations, the site files stored in the site file storage 305 include site signatures stored sequentially in time. For fine resolution processing, the example matcher controller 345 configures the example global signature processor 325 to sequentially process site signatures spaced close together in time (e.g., spaced every 15 seconds to 2 minutes) and, thus, corresponding to a fine sampling of site signatures reported from the home site 210. By configuring fine resolution processing at block 640, the example global signature processor 325 is able to closely monitor the local media content corresponding to a live track and, thus, known to be under observation at the home site 210. Control then returns to block 605 and blocks subsequent thereto at which the example global signature processor 325 obtains the next site signature to be processed based on the fine resolution configuration at block 640.

However, if there are no live tracks currently being maintained by the example global signature processor 325 (block 635), control proceeds to block 645 at which the example track reporter 340 reports information concerning the tracks recently deactivated. Additionally or alternatively, the example track reporter 340 may report such track information outside of the processing performed by the example process 530 (e.g., such as at block 535 of FIG. 5), thus allowing block 645 to be eliminated from the example process 530 of FIG. 6. Control then proceeds to block 650 at which the example matcher controller 345 determines whether the site signature represents some content that is not monitored by any reference site processor 222 (e.g. all other viewing, such as viewing associated with DVD/VCR playback, game playing, etc.). For example, at block 650 the example matcher controller 345 could count a number of unsuccessful matching attempts and determine that the site signature may still correspond to content monitored by some reference site processor 222 if the number of attempts has not exceeded a threshold. Conversely, if the number of attempts has exceeded the threshold, the example matcher controller 345 could determine that the site signature may now correspond to "all other viewing" that is not monitored by any reference site processor 222.

If the example matcher controller 345 determines that the site signature represents all other viewing (block 650), control proceeds to block 655 at which the example matcher controller 345 configures the example global signature processor 325 for coarse resolution processing. As discussed above, in some example implementations, the site files stored in the site file storage 305 include site signatures stored sequentially in time. For coarse resolution processing, the example matcher controller 345 configures the example global signature processor 325 to sequentially process site signatures spaced relatively far apart in time (e.g., spaced greater than 2 minutes apart) and, thus, corresponding to a coarse sampling of site signatures reported from the home site 210. By configuring coarse resolution processing at block 645, the processing load of the example global signature processor 325 may be reduced during all other viewing periods (e.g., such as during DVD/VCR playback, game playing, etc). Control then returns to block 605 and blocks subsequent thereto at which the example global signature processor 325 obtains the next site signature to be processed based on the coarse resolution configuration at block 650.

If the example matcher controller 345 determines that the site signature still represents some content monitored by some reference site processor 222 (block 650), control proceeds to block 660 at which the example matcher controller 345 rewinds signature matching processing to a point in time where the next site signature to be processed will be the first one that failed to update the reported tracks. By rewinding signature matching processing at block 660, when control then returns to block 605 and blocks subsequent thereto, the example global signature processor 325 will obtain the next appropriate signature that should be used for the track creation procedure performed at block 625.

An example process 630 that may be executed to implement the track update processing at block 630 of FIG. 6 and/or to implement the example track updater 335 of FIG. 3 is illustrated in FIG. 7. Execution of the example process 630 begins at block 710 at which the example track updater 335 obtains the next reference signature, or the portion of the reference signature, corresponding to the reference content source and time associated with the track to be updated. As discussed above, a track represents the history of comparing one or more site signatures to one or more reference signatures corresponding to the particular reference content source. At block 710, a live track is processed by the example track updater 335 and, thus, one or more past site signatures, or one or more past portions of a site signature, have successfully matched (substantially, partially, etc.) one or more past reference signatures, or one or more past portions of a reference signature, corresponding the track's reference content source.

Therefore, at block 710, the example track updater 335 obtains the next appropriate reference signature(s), or portion(s) of the reference signature, to compare with the current site signature being processed. The next appropriate reference signature(s), or portion(s) of the reference signature, are determined based on the time associated with the site signature being compared and the time shift between the site signature(s) and the reference signature(s). As discussed above in connection with FIG. 4A, a time shift may occur between a particular site signature and its matching reference signature when, for example, the site signature corresponds to time-shifted viewing at the home site 210, there are timing discrepancies between the clock references in the local metering system 209 generating the site signatures and the reference site processor 232 generating the reference signatures, etc. The proper time shift between the site signature(s) and the reference signature(s) corresponding to the track being updated may be determined, for example, based on a difference histogram as discussed above in connection with FIG. 4B.

After obtaining the next appropriate reference signature(s), or portion(s) of the reference signature, at block 710, control proceeds to block 715. At block 715, the example track updater 335 determines the distance(s) between the site signature and the reference signature(s), or portion(s) of the reference signature, after aligning the signatures using a preloaded shift value determined during track creation. For example, the shift(s) between the site signature and reference signature(s) may be determined during track creation by selecting the shift(s) corresponding to entries in a difference histogram having at least a predetermined number of data pair alignments (or, alternatively, having distances no greater than a predetermined distance), as discussed above in connection with FIG. 4B. The distance determined at block 715 may be computed by the example track updater 335 using any appropriate distance metric, such as, for example, the distance metric of Equation 6 above, a difference histogram, etc. If multiple shifts yield histogram entries having at least the predetermined number of data pair alignments (or alternatively having distances no greater than the predetermined distance), each such shift will correspond to a separate track for the associated reference content source.

Next, control proceeds to block 720 at which the example track updater 335 determines whether the distance between the site signature(s) and the reference signature(s), or portion(s) of the reference signature, is less than a specified distance threshold indicative of a match. If the determined distance is less than the threshold (block 720), control proceeds to block 725 at which the example track updater 335 resets the age of the track to zero. Control then proceeds to block 730 at which the example track updater 335 sets the end time of the track to be the end time of the site signature. Setting the end time of the track to be the end time of the site signature enables the example track reporter 340 to report the track duration. Execution of the example process 630 then ends.

However, if the distance determined at block 715 is not less than the specified threshold (block 720), control proceeds to block 735 at which the example track updater 335 increments the age of the track. Control then proceeds to block 740 at which the example track updater 335 determines whether the track's age is greater than a specified threshold. If the track's age is not greater than the threshold (block 740), the track is kept alive and execution of the example process 630 ends. If, however, the track's age is greater than the threshold (block 740), control proceeds to block 745 at which the example track updater 335 indicates that the track is no longer live (e.g., thereby deactivating the track). Execution of the example process 630 then ends.

Figures 9, 10:
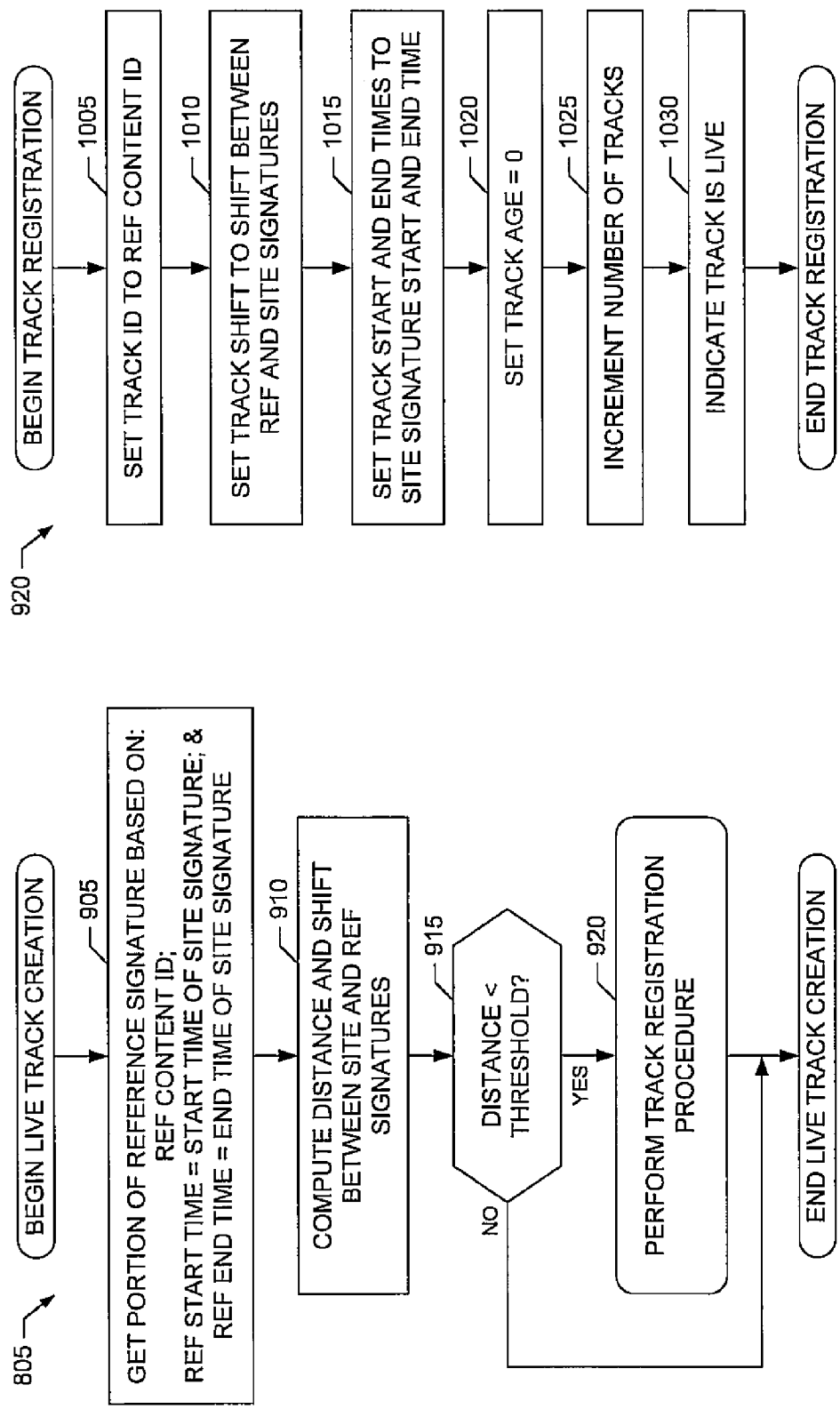
FIG. 9 is a flowchart representative of an example process for live track creation that may be used to implement a portion of the example process of FIG. 8 and/or that may be executed to implement the example global signature matcher of FIG. 3.
FIG. 10 is a flowchart representative of an example process for track registration that may be used to implement a portion of the example process of FIGS. 9, 11 and/or 12, and/or that may be executed to implement the example global signature matcher of FIG. 3.

An example process 625 that may be executed to implement the track creation processing at block 625 of FIG. 6 and/or to implement the example track creator 330 of FIG. 3 is illustrated in FIG. 8. Execution of the example process 625 begins at block 805 at which the example track creator 330 begins performing track creation procedures in a particular hierarchical order. In particular, at block 805 the example track creator 330 performs a track creation procedure to create, if possible, one or more live tracks corresponding, respectively, to one or more available live (e.g., broadcast at substantially the same time the site signature(s) undergoing processing were created) reference media content sources. In the illustrated example of FIG. 8, at block 805 the example track creator 330 will skip performing the track creation procedure if a predetermined maximum number of attempts to create a live track has already been exceeded. An example process that may be executed to implement the processing at block 805 is illustrated in FIG. 9 and discussed in greater detail below.

Next, control proceeds to block 810 at which the example track creator 330 determines whether one or more live tracks were created at block 805. If one or more live tracks were created (block 810), control proceeds to block 830 at which the example track creator 330 resets the counters for the track creation attempts. Execution of the example process 625 then ends. If, however, no tracks were created (block 810), control proceeds to block 812. At block 812, the example track creator 330 determines whether the maximum number of attempts to create a live track has been exceeded. If the number of attempts has not been exceeded (block 812), control proceeds to block 840 at which the example track creator 330 updates a signature pointer (e.g., to account for the rewind procedure performed at block 660 of FIG. 6) to enable the track creator 330 to process the next available site signature during the next execution of the example process 625. Execution of the example process 625 ends.

Figures 11, 12:
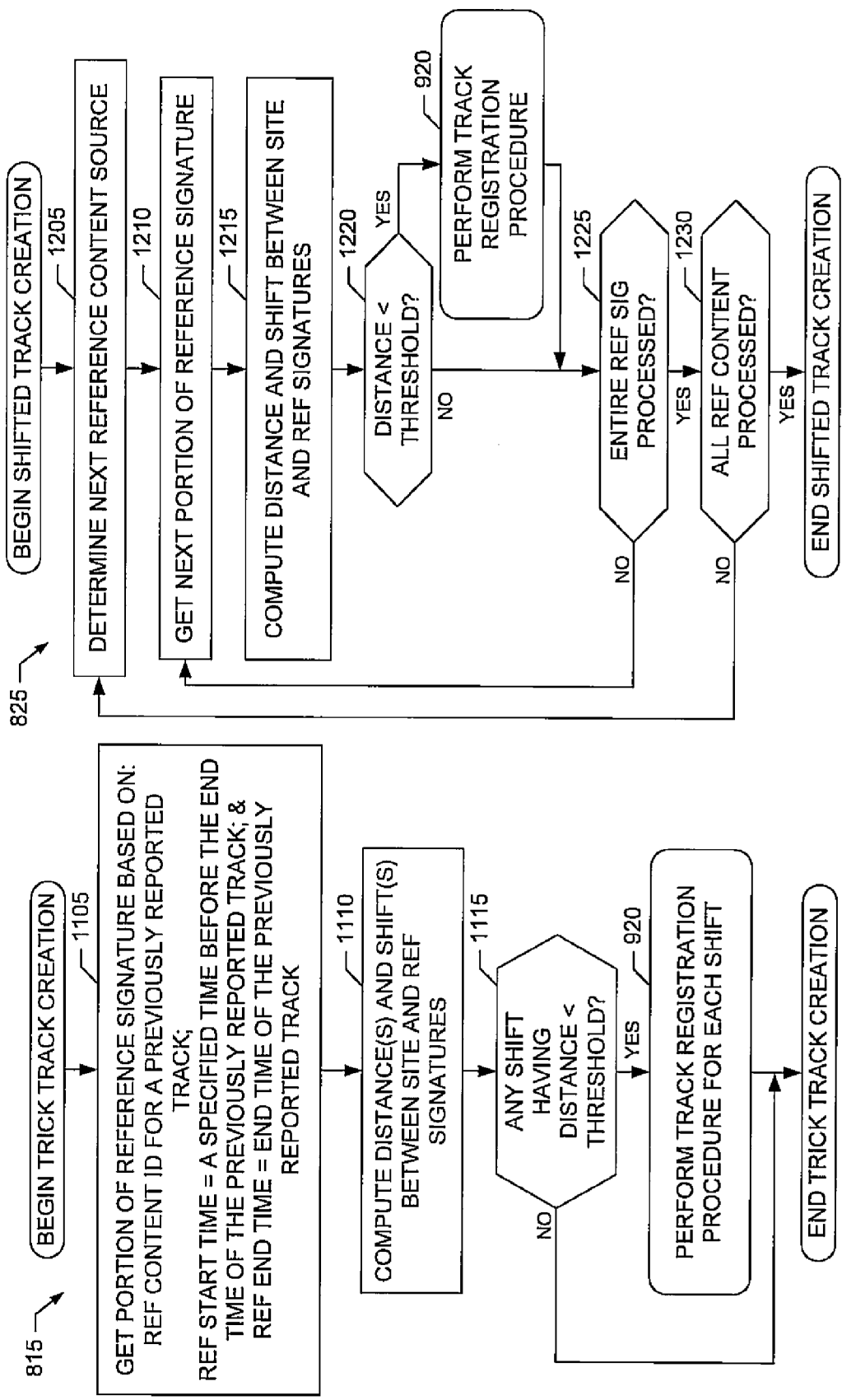
FIG. 11 is a flowchart representative of an example process for trick track creation that may be used to implement a portion of the example process of FIG. 8 and/or that may be executed to implement the example global signature matcher of FIG. 3.
FIG. 12 is a flowchart representative of an example process for shifted track creation that may be used to implement a portion of the example process of FIG. 8 and/or that may be executed to implement the example global signature matcher of FIG. 3.

If, however, the number of attempts has been exceeded (block 812), control proceeds to block 815. At block 815, the example track creator 330 performs a track creation procedure to create, if possible, one or more trick tracks corresponding, respectively, to one or more previously viewed live (e.g., broadcast at substantially the same time the site signature(s) undergoing processing were created) reference media content sources but now subjected to the particular trick mode (e.g., such as time-shifting via pausing, rewinding, fast-forwarding, etc.). In the illustrated example of FIG. 8, at block 815 the example track creator 330 will skip performing the track creation procedure if a predetermined maximum number of attempts to create a trick track has already been exceeded. An example process that may be executed to implement the processing at block 815 is illustrated in FIG. 11 and discussed in greater detail below.

Next, control proceeds to block 820 at which the example track creator determines whether one or more trick tracks were created at block 815. If one or more trick tracks were created (block 820), control proceeds to block 830 at which the example track creator 330 resets the counters for the track creation attempts. Execution of the example process 625 ends. If, however, no tracks were created (block 820), control proceeds to block 822. At block 822, the example track creator 330 determines whether the maximum number of attempts to create a trick track has been exceeded. If the number of attempts has not been exceeded (block 822), control proceeds to block 840 at which the example track creator 330 updates a signature pointer (e.g., to account for the rewind procedure performed at block 660 of FIG. 6) to enable the track creator 330 to process the next available site signature during the next execution of the example process 625. Execution of the example process 625 ends. If, however, the number of attempts has been exceeded (block 822), control proceeds to block 825.

At block 825, the example track creator 330 performs a track creation procedure to create, if possible, one or more shifted tracks corresponding, respectively, to any remaining time-shifted (e.g., stored) reference media content sources. In some implementations, the remaining time-shifted reference media content sources processed at block 825 are further subdivided in various hierarchical groupings based on various criteria including, for example, previous windows of time of varying (e.g., increasing) duration, media content known to have been previously viewed at the home site 210, etc. An example process that may be executed to implement the processing at block 825 is illustrated in FIG. 12 and discussed in greater detail below. Next, control proceeds to block 830 at which the example track creator 330 resets the counters for the track creation attempts. Execution of the example process 625 then ends.

An example process 805 that may be executed to implement the live track creation processing at block 805 of FIG. 8 and/or to implement the example track creator 330 of FIG. 3 is illustrated in FIG. 9. Execution of the example process 805 begins at block 905 at which the example track creator 330 obtains a reference signature, or a portion of the reference signature, corresponding to a particular live reference content source. In an example implementation, a reference content source is considered live if its associated media content was broadcast (or made available) to, for example, the home site(s) 210 at substantially the same time the site signature(s) undergoing processing were created. Because the example track creator 330 is performing live track creation in this context, the particular reference signature, or a portion of the reference signature, is obtained based on a reference content start time and reference content end time corresponding, respectively, to the start time and end time of the site signature being matched. To compensate for any potential discrepancy between the local clocks associated with the local metering system 209 and the reference site processor 222, respectively, the start and end times of the site signature may be adjusted accordingly.

Next, control proceeds to block 910 at which the example track creator 330 determines the distance and shift between the site signature and the reference signature, or portion of the reference signature, obtained at block 905. Even for presentation of live media content (e.g., broadcast at substantially the same time the site signature(s) undergoing processing were created), the times (e.g., time stamps) associated with the site signature and reference signature may be inaccurate (misaligned) due to discrepancies in the time sources corresponding to, for example, the local metering system 209 and the reference site processor 222. Thus, at block 910 the example track creator 330 determines the shift between the site signature and the reference signature, or portion of the reference signature, which yields a minimum distance (or most substantial match), wherein the shift then corresponds to the aforementioned inaccuracy. For example, at block 910 the example track creator 330 may determine a difference histogram, such as the difference histogram discussed above in connection with FIG. 4B, for the site signature and the reference signature, or portion of the reference signature. The example track creator 330 may then evaluate the difference histogram to determine the shift yielding the minimum distance (or most substantial match).

Next, control proceeds to block 915 at which the example track creator 330 determines whether the distance between the site signature and the reference signature, or portion of the reference signature, determined at block 910 is less than a specified distance threshold indicative of a match. If the distance is not less than the threshold (block 915), a live track is not created for the particular reference content source and execution of the example process 805 ends. If, however, the distance is less than the threshold (block 915), control proceeds to block 920 at which the example track creator 330 creates a live track for the particular reference content source by causing the example track reporter 340 to perform a track reporting procedure. An example process that may be executed to implement the processing at block 920 is illustrated in FIG. 10 and discussed in greater detail below. Execution of the example process 805 then ends. Execution of the example process 805 is then repeated, if necessary, for each reference signature loaded at block 505 of FIG. 5.

Additionally or alternatively, in an example implementation the processing at blocks 910-920 may be configured to create one or more tracks, one for each shift between the site and reference signatures that results in a distance no greater than a specified distance threshold. In such an example implementation, the processing at blocks 910-915 is configured to return all such shifts meeting the threshold. The processing at block 920 is configured accordingly to register and, thus, create a track corresponding to each such returned shift.

An example process 920 that may be executed to implement the track reporting processing at block 920 of FIG. 9 and/or to implement the example track reporter 340 of FIG. 3 is illustrated in FIG. 10. Execution of the example process 920 begins at block 1005 at which the example track reporter 340 sets a track identifier for the track being reported to correspond to a reference content identifier of the particular reference media content to be associated with the reported track. Control then proceeds to block 1010 at which the example track reporter 340 sets the shift for the track to be the shift between the site signature and the reference signature corresponding to the particular reference content source associated with the track.

Next, control proceeds to block 1015 at which the example track reporter 340 sets the track start and end times to be, respectively, the start and end times of the current site signature being processed. Next, control proceeds to block 1020 at which the example track reporter 340 sets the age to the track to zero to indicate that the track corresponds to a successful match with the current site signature. As discussed above in connection with FIG. 7, the age parameter may be incremented and evaluated to allow a predetermined number of consecutive non-matches before causing a particular track to be deactivated. Control then proceeds to block 1025 at which the example track reporter 340 increments the number of tracks currently being maintained by the example global signature matcher 300. Then, control proceeds to block 1030 at which the example track reporter 340 indicates that the track being reported is live (e.g., active). Execution of the example process 920 then ends.

An example process 815 that may be executed to implement the trick track creation processing at block 815 of FIG. 8 and/or to implement the example track creator 330 of FIG. 3 is illustrated in FIG. 11. Execution of the example process 815 begins at block 1105 at which the example track creator 330 is configured to perform trick track creation in which the observed local content (e.g., observed at the home site 210) corresponding to the site signature(s) being matched is assumed to have undergone a trick mode (e.g., such as pausing, rewinding, etc.). As such, the currently observed local content is assumed to be a delayed version of the original live reference content (e.g., broadcast at substantially the same time the site signature(s) undergoing processing were created) viewed previously via, for example, the output device 232 (e.g., such as the presentation device 120) at the home site 210. If the currently observed local content does actually correspond to a delayed version of previously viewed live reference content, the current site signature being processed would match a past reference signature (or past portion thereof) corresponding to a previously live and reported track. Thus, at block 1105, the example track creator 330 obtains a past reference signature, or a past portion of the reference signature, for a reference content source corresponding to a track that was previously live and reported at, for example, block 535 of FIG. 5. The particular reference signature, or a portion of the reference signature, is obtained based on a reference content end time corresponding to the end time of the previously reported track, and a reference content start time set to some specified time window before the end time of the previously reported track. For example, the specified time window may correspond to a maximum amount of expected pause or rewind time based on, for example, the amount of memory known to be available in the time-shifting device 112.

Next, control proceeds to block 1110 at which the example track creator 330 determines the distances and shifts between the site signature and the past reference signature, or past portion of the reference signature, obtained at block 1105. In particular, at block 1110 the example track creator 330 determines all shifts (e.g., delays) between the site signature and the past reference signature, or past portion of the reference signature, that yields distances less than a specified distance (or, alternatively, that yields at least a specified number of data pair alignments between the site signature and the past reference signature, or past portion of the reference signature). For example, at block 1110 the example track creator 330 may determine a difference histogram, such as the difference histogram discussed above in connection with FIG. 4B, for the site signature and the past reference signature, or past portion of the reference signature. The example track creator 330 may then evaluate the difference histogram to determine all shifts (e.g., delays) having distances less than the specified distance (or yielding at least the specified number of data pair alignments).

Next, control proceeds to block 1115 at which the example track creator 330 determines whether any shifts between the site signature and the past reference signature, or past portion of the reference signature, were determined at block 1110 to correspond to distances less than the specified distance threshold indicative of a match. If no shifts yielding distances less than the threshold were identified (block 1115), no trick tracks are created for the particular reference content source and execution of the example process 815 ends. If, however, shifts yielding distances less than the threshold were identified (block 1115), control proceeds to block 920 at which the example track creator 330 creates a trick track for each shift of the particular reference content source by causing the example track reporter 340 to perform a track reporting procedure for each such shift. An example process that may be executed to implement the processing at block 920 is illustrated in FIG. 10 and discussed in greater detail above. Execution of the example process 815 then ends. Execution of the example process 815 is then repeated, if necessary, for each reference content source corresponding to a track that was previously live and reported at, for example, block 535 of FIG. 5.

An example process 825 that may be executed to implement the shifted track creation processing at block 825 of FIG. 8 and/or to implement the example track creator 330 of FIG. 3 is illustrated in FIG. 12. Execution of the example process 825 begins at block 1205 at which the example track creator 330 selects the next reference content source for which shifted track creation is to be attempted. The example track creator 330 may select the possible reference content sources based on content information stored in, for example, the database 226. Next, control proceeds to block 1210 at which the example track creator 330 obtains a next portion of a reference signature, or a next reference signature in a sequence of reference signatures, for a time period (e.g., indicated via time stamps) before the start time of the site signature being processed. At block 1210, the obtained next portion of the reference signature, or the next reference signature in the sequence of reference signatures, corresponds to the reference content source selected at block 1205.

Next, control proceeds to block 1215 at which the example track creator 330 determines the distance and shift between the site signature and the portion of the reference signature, or the reference signature, obtained at block 1210. In particular, at block 1215 the example track creator 330 determines the shift between the site signature and the portion of the reference signature, or the reference signature, that yields a minimum distance (or most substantial match). The shift may correspond to, for example, a delay resulting from time-shifting of the observed local media content (e.g., at the home site 210) relative to the reference media content. Additionally or alternatively, the shift may correspond to, for example, discrepancies in the time sources corresponding to, for example, the local metering system 209 and the reference site processor 222. To determine the distance and shift at block 1215, the example track creator 330 may determine a difference histogram, such as the difference histogram discussed above in connection with FIG. 4B, for the site signature and the portion of the reference signature, or the reference signature. The example track creator 330 may then evaluate the difference histogram to determine the shift (e.g., alignment and/or delay) yielding the minimum distance (or most substantial match). Additionally or alternatively, the example track creator 530 may evaluate the distance histogram to determine shifts yielding distances no greater than a specified distance thresholds.

Next, control proceeds to block 1220 at which the example track creator 330 determines whether the distance between the site signature and the portion of the reference signature, or the reference signature, determined at block 1215 is less than a specified distance threshold indicative of a match. If the determined distance is less than the threshold (block 1220), control proceeds to block 920 at which the example track creator 330 creates a shifted track for the particular reference content source and for the shift determined at block 1215 by causing the example track reporter 340 to perform a track registration procedure. An example process that may be executed to implement the processing at block 920 is illustrated in FIG. 10 and discussed in greater detail above. Execution of the example process 825 then proceeds to block 1225.

Additionally or alternatively, in an example implementation the processing at blocks 1215, 1220 and 920 may be configured to create one or more tracks, one for each shift between the site and reference signatures that results in a distance no greater than a specified distance threshold. In such an example implementation, the processing at blocks 1215-1220 is configured to return all such shifts meeting the threshold. The processing at block 920 is configured accordingly to register and, thus, create a track corresponding to each such returned shift.

However, if the determined distance is not less than the threshold (block 1220), control also proceeds to block 1225 at which the example track creator 330 determines whether the entire portion of the reference signature, or all signatures in the sequence of signatures, corresponding to the reference content source selected at block 1205 have been processed. If the entire portion of the reference signature, or all signatures in the sequence of signatures, have not been processed (block 1225), control returns to block 1210 and blocks subsequent thereto at which the example track creator 330 obtains the next available portion of the reference signature, or the next reference signature in the sequence of reference signatures, corresponding to the selected content source.

If, however, the entire portion of the reference signature, or all signatures in the sequence of signatures, have been processed (block 1225), control proceeds to block 1230 at which the example track creator 330 determines whether all available reference content sources have been examined. If all available reference content sources have not been examined (block 1230), control returns to block 1205 and blocks subsequent thereto at which the example track creator 330 selects the next available reference content source for which shifted track creation is to be attempted. However, if all available reference content sources have been examined (block 1230), execution of the example process 825 then ends.

A first example process 1300 that may be executed to determine difference histograms to implement the example track creator 330 and/or the example track updater 335 of FIG. 3, and/or at least portions of the processing at block 715 of FIG. 7, block 910 of FIG. 9, block 1110 of FIG. 11 and/or block 1215 of FIG. 12, is illustrated in FIG. 13A. Without loss of generality, the operation of the example process 1300 is described herein from the perspective of execution by the example track creator 330. However, the example process 1300 may be similarly executed by the example track updater 335 and/or any other apparatus, processor, etc.

With this in mind, the example process 1300 begins execution at block 1305 at which the example track creator 330 obtains the site signature and reference signature for difference histogram determination. For example, the example track creator 330 may obtain a particular site signature, such as the example site signature 404 of FIG. 4A, from the site file storage 305, and a particular reference signature, such as the example reference signature 402, from the database 226. Control then proceeds to block 1310 at which the example track creator 330 clears a buffer used to store the difference histogram.

Next, control proceeds to block 1315 at which the example track creator 330 divides the time values in each of the data pairs included in the site signature 404 and the reference signature 402 by the width of a window, such as, for example, the window 430 having a width s. As discussed above in connection with FIG. 4A, the window 430 allows the example track creator 330 to determine that a data pair from the site signature 404 substantially aligns with a corresponding data pair from the reference signature 402 if the time values in the two data pairs lie within the width s of the window 430. Furthermore, as discussed above, the window 430 may be implemented by dividing the time values of the signature data pairs by the width s of the window 430 and then truncating the divided time values to be integer values. Thus, at block 1315 the example track creator implements the window 430 by dividing the time values in the data pairs of the site signature 404 and the reference signature 402 by the window width s. In an alternative implementation, block 1315 and its associated processing overhead may be eliminated by dividing the time values in each site signature 404 and reference signature 402 by the window width s before the signatures are stored in the site file storage 305 and the database 226, respectively.

Control next proceeds to block 1320 at which the example track creator 330 shifts the site signature 404 relative to the reference signature 402 and, for each relevant shift, determines the number of data pairs in the site signature 404 that align (after processing at block 1315 to implement the window 430) with corresponding data pairs in the reference signature 402. The example track creator 330 also stores the determined number of aligned data pairs for each relevant shift in the difference histogram buffer that was cleared at block 1310. For example, at block 1320 the example track creator 330 may perform an initial shift such that the data pair 414 of the site signature 404 aligns with data pair 418 of the reference signature 402. Then, after determining the number of data pairs that align, the example track creator 330 may perform a subsequent shift such that the data pair 414 of the site signature 404 aligns with the data pair 420 of the reference signature 402. The example track creator may continue shifting the signatures and determining the number of aligned data pairs until, for example, the data pair 406 of the site signature 404 aligns with the data pair 424 of the reference signature 402. Furthermore, the example track creator 330 may limit the shifting of the site signature 404 relative to the reference signature 402 to only those relevant shifts for which there is some minimum specified overlap of the site signature 404 and the reference signature 402.

After processing at block 1320 completes and the difference histogram buffer contains the number of data pairs that align between the site signature 404 and the reference signature 402 for each relevant shift, control proceeds to block 1325. At block 1325 the example track creator 330 determines the peak value of the difference histogram buffer. This peak value corresponds to the shift between the site signature 404 and the reference signature 402 that yields the best match (e.g., most aligned data pairs) or, equivalently, the minimum distance between the two signatures.

Next, control proceeds to block 1330 at which the example track creator 330 determines a distance value between the site signature 404 and the reference signature 402 based on the peak value of the difference histogram determined at block 1325. In some example implementations, the example track creator 330 may implement Equation 6 discussed above to determine the distance value. In such implementations, at block 1325 the example track creator 330 divides the peak value of the difference histogram (corresponding to the peak number of matching data pairs) by the maximum of the number of data pairs in the site signature 404 and number of data pairs in the reference signature 402. The result is then subtracted from a constant value of 1 according to Equation 6 and scaled to yield distance values having a desired range. For example, if all the data pairs in the site signature 404 and the reference signature 402 align, and both signatures have the same number of data pairs, then the distance determined at block 1330 will be zero.

Next, control proceeds to block 1335 at which the example track creator 330 scales the distance determined at block 1330 to account for how well the actual values of the data pairs match for the data pairs that align between the site signature 404 and the reference signature 402 at the peak value of the difference histogram. For example, at block 1335 the example track creator 330 may scale the distance by a ratio $(N_T/N_M)$, where $N_T$ corresponds to the total number of aligned data pairs and $N_M$ corresponds to the number of aligned data pairs that exhibit the same trend in magnitude. In an example implementation, $N_M$ may be computed by comparing consecutive aligned data pairs and counting the number of times the magnitude trends (e.g., increasing, decreasing, or constant) of the site signature 404 and the reference signature 402 match at the aligned data pair locations.

For example, the magnitude trend of a signature (e.g., the site signature 404 or the reference signature 402) at a first particular data pair (e.g., such as at the location of the first of two consecutive aligned data pairs) may be determined by computing a data pair ratio equal to the magnitude of a second subsequent data pair (e.g., such as at the location of the second of two consecutive aligned data pairs) divided by the magnitude of the first data pair. Then, if the data pair ratio is greater than a first predetermined threshold (e.g., a predetermined value greater than 1, such as 1.05), the magnitude trend for the first data pair can be set to indicate an increasing trend. Conversely, if the data pair ratio is less than a second predetermined threshold (e.g., a value less than 1, such as 0.95), the magnitude trend for the first data pair can be set to indicate a decreasing trend. Finally, in this example, if the data pair ratio lies between the two thresholds (e.g., such as between 0.95 and 1.05), the magnitude trend for the first data pair can be set to indicate a constant trend. In such an example implementation, the value of $N_M$ may be determined by counting the number of matching increasing trends, decreasing trends and constant trends in the site signature 404 and reference signature 402 at the aligned data pair locations. To prevent division by zero, the value of $N_M$ can be set to some small value (e.g., such as 0.01) if there are no matching trends in the site signature 404 and reference signature 402 at the aligned data pair locations. After scaling at block 1335 completes, execution of the example process 1300 then ends.

A second example process 1350 that may be executed to determine difference histograms to implement the example track creator 330 and/or the example track updater 335 of FIG. 3, and/or at least portions of the processing at block 715 of FIG. 7, block 910 of FIG. 9, block 1110 of FIG. 11 and/or block 1215 of FIG. 12, is illustrated in FIG. 13B. The second example process 1350 shares some similarities with the first example process 1300. As such, blocks having similar functionality in FIGS. 13A and 13B are labeled with the same reference numerals. Furthermore, without loss of generality, the operation of the second example process 1350 is described herein from the perspective of execution by the example track creator 330. However, the second example process 1350 may be similarly executed by the example track updater 335 and/or any other apparatus, processor, etc.

With this in mind, the example process 1350 begin execution at block 1305 at which the example track creator 330 obtains the site signature and reference signature for difference histogram determination. Control then proceeds to block 1310 at which the example track creator 330 clears a buffer used to store the difference histogram. A more detailed explanation of the processing at blocks 1305 and 1310 is provided above in connection with the description of FIG. 13A.

Next, control proceeds to block 1355 at which the example track creator 330 gets the next reference signature data pair for processing. For example, and referring to the example of FIG. 4A, during the first time through execution of the example process 1350, the example track creator 330 may get the data pair 418 of the example reference signature 402. Control then proceeds to block 1360 at which the example track creator 330 gets the next site signature data pair for processing. For example, and referring to the example of FIG. 4A, during the first time through execution of the example process 1350, the example track creator 330 may get the data pair 408 of the example site signature 404. Control then proceeds to block 1365.

At block 1365, the example track creator 330 determines the time difference between the reference signature data pair obtained at block 1355 and the site signature data pair at block 1360. Continuing with the preceding example, if the data pair 418 of the example reference signature 402 was obtained at block 1355 and the data pair 408 of the example site signature 404 was obtained at block 1360, then the time difference determined at block 1365 is (X−Y). Next, control proceeds to block 1370 at which the example track creator 330 divides the time difference determined at block 1365 by the width of a window, such as, for example, the window 430 having a width s. If in the preceding example the window 430 having a width s is used, the resulting scaled time difference determined by the example track creator 330 at block 1370 is [(X−Y)/s]. In an alternative implementation, division by the width of the window may occur prior to difference histogram processing, such as, for example, when the reference signature 402 and the site signature 404 are initially received by the central facility processor 224 for processing. In such an alternative implementation, the additional overhead processing at block 1370 is no longer needed. Returning to the illustrated example, after processing at block 1370 completes, control then proceeds to block 1375.

At block 1375, the example track creator 330 increments the bin of the difference histogram buffer corresponding to the scaled time difference determined at block 1370. Continuing with the preceding example, if the scaled time difference determined at block 1370 is [(X−Y)/s], then the example track creator 330 will increment the bin of the example difference histogram 450 corresponding to the offset [(X−Y)/s] (as shown in the example of FIG. 4B). Control then proceeds to block 1380 at which the example track creator 330 determines whether all of the data pairs in the site signature obtained at block 1360 have been processed. If all the data pairs have not been processed (block 1380), control returns to block 1360 at which the example track creator 330 gets the next site signature data pair for processing (e.g., such as the data pair 410 of the example site signature 404 of FIG. 4A).

However, if all the data pairs in the site signature have been processed (block 1380), control proceeds to block 1385 at which the example track creator 330 determines whether all of the data pairs in the reference signature obtained at block 1355 have been processed. If all the data pairs have not been processed (block 1385), control proceeds to block 1390 at which the example track creator 330 resets the index, pointer, etc., used to step through the data pairs of the site signature 404 in preparation for comparison with the next reference signature data pair. Control then returns to block 1355 at which the example track creator 330 gets the next reference signature data pair for processing (e.g., such as the data pair 420 of the example reference signature 402 of FIG. 4A). If, however, all the data pairs have been processed (block 1385), control proceeds to block 1325

At block 1325 the example track creator 330 determines the peak value of the difference histogram buffer. This peak value corresponds to the shift between the site signature 404 and the reference signature 402 that yields the best match or, equivalently, the minimum distance between the two signatures. In an alternative implementation, at block 1325 the example track creator 330 may determine all values of the difference histogram buffer that exceed a predetermined threshold for the number of aligned data pairs between the site and reference signature (or, alternatively, that do not exceed a predetermined threshold for the distance between the two signatures) and return the histogram buffer locations (e.g., shifts) corresponding to these determined values. Returning to the illustrated example, control next proceeds to block 1330 at which the example track creator 330 determines a distance value between the site signature 404 and the reference signature 402 based on the peak value of the difference histogram determined at block 1325. For example, and as indicated above in connection with the description of FIG. 13A, the example track creator 330 may implement Equation 6 discussed above to determine the distance value.

Next, control proceeds to block 1335 at which the example track creator 330 scales the distance determined at block 1330 to account for how well the actual values of the data pairs match for the data pairs that align between the site signature 404 and the reference signature 402 at the peak value of the difference histogram. An example procedure for determining the scaling at block 1335 is discussed above in connection with the description of FIG. 13A. In the alternative implementation discussed above, if at block 1325 the example track creator 330 is configured to determine a plurality of values and corresponding histogram buffer locations (e.g., shifts), then at blocks 1330 and 1335 the example track creator 330 will determine a corresponding plurality of scaled distance values between the site signature 404 and the reference signature 402. Returning to the illustrated example, after the processing at block 1335 completes, execution of the example process 1350 then ends.

Figure 14:
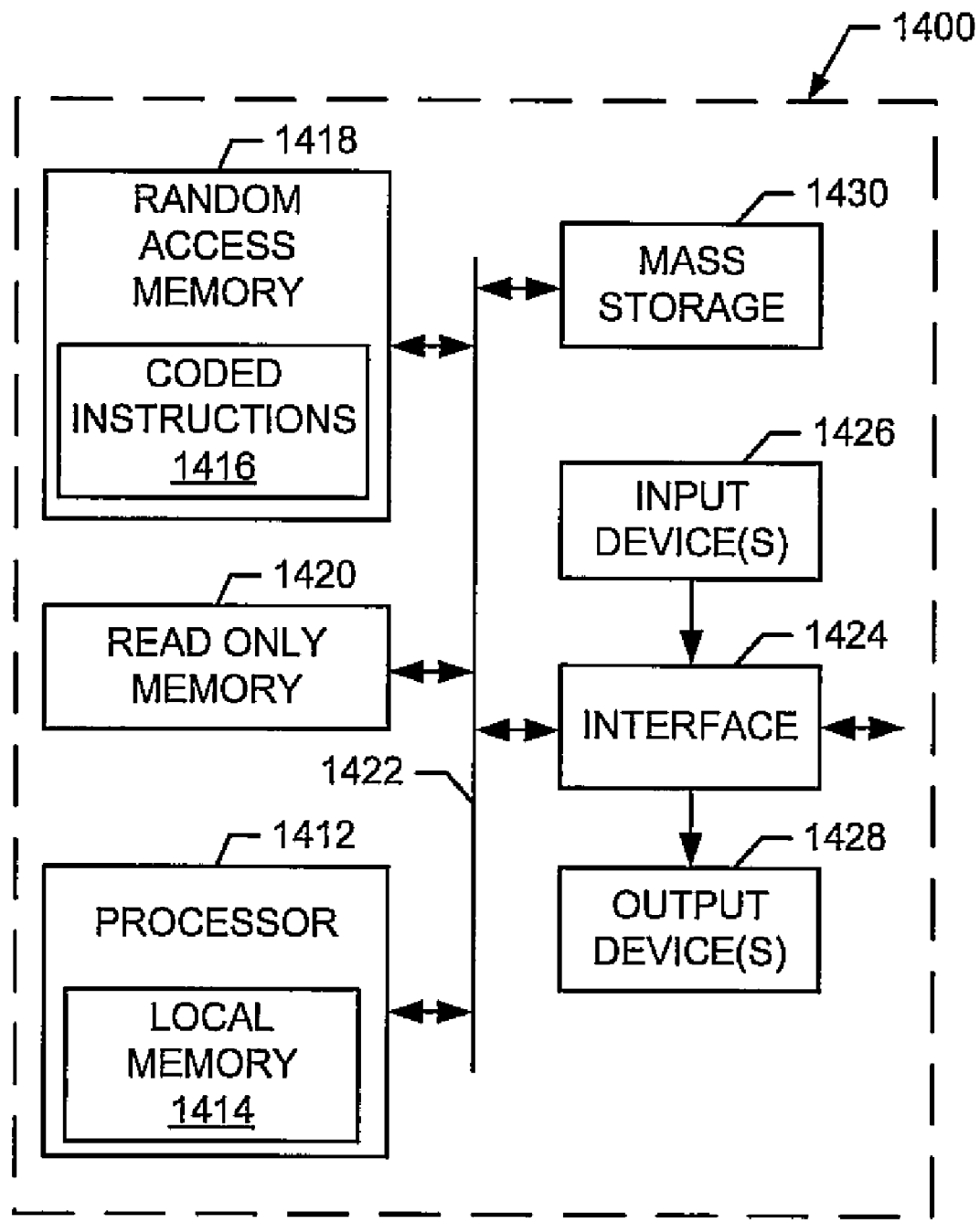
FIG. 14 is a block diagram of an example computer that may execute example machine readable instructions used to implement some or all of the processes of FIGS. 5-12, 13A and/or 13B to implement the example global signature matcher of FIG. 3.

FIG. 14 is a block diagram of an example computer 1400 capable of implementing the apparatus and methods disclosed herein. The computer 1400 can be, for example, a server, a personal computer, a personal digital assistant (PDA), an Internet appliance, a DVD player, a CD player, a digital video recorder, a personal video recorder, a set top box, or any other type of computing device.

The system 1400 of the instant example includes a processor 1412 such as a general purpose programmable processor. The processor 1412 includes a local memory 1414, and executes coded instructions 1416 present in the local memory 1414 and/or in another memory device. The processor 1412 may execute, among other things, machine readable instructions to implement the processes represented in FIGS. 5-12, 13A and 13B. The processor 1412 may be any type of processing unit, such as one or more microprocessors from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 1412 is in communication with a main memory including a volatile memory 1418 and a non-volatile memory 1420 via a bus 1422. The volatile memory 1418 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1420 may be implemented by flash memory and/or any other desired type of memory device. Access to the main memory 1418, 1420 is typically controlled by a memory controller (not shown).

The computer 1400 also includes an interface circuit 1424. The interface circuit 1424 may be implemented by any type of interface standard, such as an Ethernet interface, a universal serial bus (USB), and/or a third generation input/output (3GIO) interface.

One or more input devices 1426 are connected to the interface circuit 1424. The input device(s) 1426 permit a user to enter data and commands into the processor 1412. The input device(s) can be implemented by, for example, a keyboard, a mouse, a touchscreen, a track-pad, a trackball, an isopoint and/or a voice recognition system.

One or more output devices 1428 are also connected to the interface circuit 1424. The output devices 1428 can be implemented, for example, by display devices (e.g., a liquid crystal display, a cathode ray tube display (CRT)), by a printer and/or by speakers. The interface circuit 1424, thus, typically includes a graphics driver card.

The interface circuit 1424 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The computer 1400 also includes one or more mass storage devices 1430 for storing software and data. Examples of such mass storage devices 1430 include floppy disk drives, hard drive disks, compact disk drives and digital versatile disk (DVD) drives. The mass storage device 1430 may implement the database 226 and/or the site file storage 305. Alternatively, the volatile memory 1418 may implement the database 226 and/or the site file storage 305.

As an alternative to implementing the methods and/or apparatus described herein in a system such as the device of FIG. 14, the methods and or apparatus described herein may be embedded in a structure such as a processor and/or an ASIC (application specific integrated circuit).

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to determine whether a monitored media content presentation corresponds to a reference content source, the method comprising:

creating, using a processor, a track corresponding to the reference content source and representative of a history of signature matching results when a first site signature in a plurality of site signatures corresponding to the monitored media content presentation and a first reference signature in a plurality of reference signatures corresponding to the reference content source are determined to match at a first time offset between the first site signature and the first reference signature, the first time offset being determined from a histogram representing a plurality of distances between the first site signature and the first reference signature, the plurality of distances corresponding to a respective plurality of possible time offsets between the first site signature and the first reference signature; and updating the track, using the processor, to indicate the track is at least one of (1) still active when a subsequent second site signature in the plurality of site signatures matches a subsequent second reference signature in the plurality of reference signatures at the first time offset corresponding to the track, or (2) inactive when a number of subsequent site signatures in the plurality of site signatures fails to match at least one subsequent reference signature in the plurality of reference signatures at the first time offset corresponding to the track.

2. A method as defined in claim 1 wherein the first site signature is determined to match the first reference signature at the first time offset when the first time offset yields a distance between the first site signature and the first reference signature that meets a threshold.

3. A method as defined in claim 1 wherein the first site signature comprises a plurality of site data pairs and the first reference signature comprises a plurality of reference data pairs, and the histogram represents the plurality of distances by storing a respective number of aligned data pairs between the first site signature and the first reference signature for each of the plurality of possible time offsets between the first site signature and the first reference signature.

4. A method as defined in claim 1 further comprising selecting the reference content source from a plurality of reference content sources to be compared with the monitored media content based on a hierarchical ordering of the plurality of reference content sources.

5. A method as defined in claim 4 wherein the hierarchical ordering causes a first reference content source corresponding to a possible live presentation of the first reference content at a monitored site corresponding to the monitored media content to be selected before a second reference content source corresponding to a possible time-shifted presentation of second reference content at the monitored site.

6. A method as defined in claim 5 wherein the presentation of the first reference content is considered to be live when the first reference content was broadcast by the first reference content source at a substantially similar time that the monitored media content was presented at the monitored site.

7. A method as defined in claim 5 wherein the presentation of the first reference content is considered to be time-shifted when the first reference content was broadcast by the first reference content source at a substantially different time than the monitored media content was presented at the monitored site.

8. A method as defined in claim 1 further comprising configuring a fine resolution for comparing subsequent site signatures with subsequent reference signatures when at least one of the first site signature matches the first reference signature or the second site signature matches the second reference signature.

9. A method as defined in claim 1 further comprising configuring a coarse resolution for comparing subsequent site signatures with subsequent reference signatures when no tracks are active after a predetermined number of matching attempts.

10. A method as defined in claim 1 further comprising rewinding selection of site signatures for comparison with reference signatures when a last remaining track is deactivated.

11. A method as defined in claim 1 further comprising selecting the first reference signature for comparison with the first site signature to have a reference start time corresponding to a start time of the first site signature when the reference content source corresponds to a possible live presentation of first reference content at a monitored site corresponding to the monitored media content.

12. A method as defined in claim 1 further comprising selecting the first reference signature for comparison with the first site signature to have a reference start time corresponding to a predetermined time prior to an end time of a previously created track when the reference content source corresponds to a possible time-shifted presentation of first reference content at a monitored site corresponding to the monitored media content.

13. A method as defined in claim 1 wherein each site signature comprises a sequence of site data pairs and each reference signature comprises a sequence of reference data pairs, and further comprising:
converting each site signature to a signature representation wherein each site data pair includes an elapsed time value relative to a start time of the site signature; and
converting each reference signature to the signature representation wherein each reference data pair includes an elapsed time value relative to a start time of the reference signature.

14. A system to measure audience exposure to media content, the system comprising:
a plurality of local metering systems to determine site signatures corresponding to a plurality of monitored media content presentations at a plurality of monitored sites; and
a central facility to receive a plurality of site signatures from the plurality of local metering systems and to determine whether a first site signature corresponding to a first monitored media content presentation at a first monitored site matches one or more reference signatures corresponding to respective one or more reference content sources selected for matching based on a hierarchical ordering of the plurality of reference content sources into a first group of live reference content sources and a second group of time-shifted reference content sources, the central facility comprising:
a track creator to create a set of tracks corresponding to a first reference content source when a first reference signature associated with the first reference content source is determined to match the first site signature corresponding to the first monitored media content presentation, each track in the set of tracks corresponding to a respective time offset between the first reference signature and the first site signature determined to yield a match;
a track updater to update a first track in the created set of tracks when a subsequent second reference signature associated with the first reference content source is determined to match a subsequent second site signature corresponding to the first monitored media content presentation for the respective time offset corresponding to the first track, the track updater to update the first track by at least (1) indicating that the first track is still active and (2) maintaining a history of signature matches for the respective time offset corresponding to the first track; and
a database to store at least one of the reference signatures or the site signatures.

15. A system as defined in claim 14 wherein at least one of the track creator or track updater is to determine whether two signatures match using a histogram to represent a plurality of distances between the two signatures, the plurality of distances corresponding to a respective plurality of time offsets between the two signatures.

16. A system as defined in claim 14 wherein the central facility further comprises a track reporter to report tracks created by the track creator and updated by the track updater.

17. A system as defined in claim 14 wherein the central facility further comprises a signature converter to convert signatures to a signature representation, a converted signature comprising a sequence of data pairs, each data pair including an elapsed time value relative to a start time of the sequence of data pairs.

18. A tangible machine readable storage medium storing machine readable instructions which, when executed, cause a machine to at least:
create a track corresponding to a reference content source and representative of a history of signature matching results when a first site signature in a plurality of site signatures corresponding to a monitored media content presentation and a first reference signature in a plurality of reference signatures corresponding to the reference content source are determined to match at a first time offset between the first site signature and the first reference signature, the first time offset being determined from a histogram representing a plurality of distances between the first site signature and the first reference signature, the plurality of distances corresponding to a respective plurality of possible time offsets between the first site signature and the first reference signature; and
update the track to indicate the track is at least one of (1) still active when a subsequent second site signature in the plurality of site signatures matches a subsequent second reference signature in the plurality of reference signatures at the first time offset corresponding to the track, or (2) inactive when a number of subsequent site signatures in the plurality of site signatures fails to match at least one subsequent reference signature in the plurality of reference signatures at the first time offset corresponding to the track.

19. A storage medium as defined in claim 18 wherein the first site signature is determined to match the first reference signature at the first time offset when the first time offset yields a distance between the first site signature and the first reference signature that meets a threshold.

20. A storage medium as defined in claim 18 wherein the machine readable instructions, when executed, further cause the machine to at least select the reference content source from a plurality of reference content sources to be compared with the monitored media content based on a hierarchical ordering of the plurality of reference content sources.

21. A storage medium as defined in claim 18 wherein each site signature comprises a sequence of site data pairs and each reference signature comprises a sequence of reference data pairs, and the machine readable instructions, when executed, further cause the machine to at least:
convert each site signature to a signature representation wherein each site data pair includes an elapsed time value relative to a start time of the site signature; and
convert each reference signature to the signature representation wherein each reference data pair includes an elapsed time value relative to a start time of the reference signature.

* * * * *